United States Patent
Zhang et al.

(10) Patent No.: US 10,968,319 B2
(45) Date of Patent: Apr. 6, 2021

(54) SILICONE HYDROGEL CONTACT LENSES

(71) Applicant: Novartis AG, Basel (CH)

(72) Inventors: Steve Yun Zhang, Sugar Hill, GA (US); Maria F. Gubitosi Raspino, Lilburn, GA (US); Richard Charles Breitkopf, Dunwoody, GA (US); Daqing Wu, Suwanee, GA (US); Junhao Ge, Johns Creek, GA (US); Augustine Twum Kumi, Grayson, GA (US); Zach Munoz, Smyrna, GA (US); Weihong Lang, Suwanee, GA (US)

(73) Assignee: Alcon Inc., Fribourg (CH)

( * ) Notice: Subject to any disclaimer, the term of this patent is extended or adjusted under 35 U.S.C. 154(b) by 57 days.

(21) Appl. No.: 16/281,400

(22) Filed: Feb. 21, 2019

(65) Prior Publication Data

US 2019/0263971 A1  Aug. 29, 2019

Related U.S. Application Data

(60) Provisional application No. 62/635,048, filed on Feb. 26, 2018.

(51) Int. Cl.
| | | |
|---|---|---|
| *G02B 1/04* | (2006.01) | |
| *C08G 77/442* | (2006.01) | |
| *C08J 3/24* | (2006.01) | |
| *B29D 11/00* | (2006.01) | |
| *B29K 83/00* | (2006.01) | |

(52) U.S. Cl.
CPC ........ *C08G 77/442* (2013.01); *B29D 11/0048* (2013.01); *B29D 11/00067* (2013.01); *C08J 3/24* (2013.01); *G02B 1/043* (2013.01); *B29K 2083/00* (2013.01); *B29K 2823/12* (2013.01); *B29K 2995/0093* (2013.01); *C08G 2210/00* (2013.01)

(58) Field of Classification Search
CPC ................................................... G02B 1/043
See application file for complete search history.

(56) References Cited

U.S. PATENT DOCUMENTS

| | | |
|---|---|---|
| 4,136,250 A | 1/1979 | Mueller |
| 4,153,641 A | 5/1979 | Deichert et al. |
| 4,182,822 A | 1/1980 | Chang |
| 4,189,546 A | 2/1980 | Deichert et al. |
| 4,254,248 A | 3/1981 | Friends et al. |
| 4,259,467 A | 3/1981 | Keogh et al. |
| 4,260,725 A | 4/1981 | Keogh et al. |
| 4,261,875 A | 4/1981 | LeBoeuf |
| 4,276,402 A | 6/1981 | Chromecek et al. |
| 4,327,203 A | 4/1982 | Deichert et al. |
| 4,341,889 A | 7/1982 | Deichert et al. |
| 4,343,927 A | 8/1982 | Chang |
| 4,355,147 A | 10/1982 | Deichert et al. |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany et al. |
| 4,605,712 A | 8/1986 | Mueller et al. |
| 4,661,575 A | 4/1987 | Tom |
| 4,684,538 A | 8/1987 | Klemarczyk |
| 4,703,097 A | 10/1987 | Wingler et al. |
| 4,833,218 A | 5/1989 | Lee |
| 4,837,289 A | 6/1989 | Mueller et al. |
| 4,954,586 A | 9/1990 | Toyoshima et al. |
| 4,954,587 A | 9/1990 | Mueller |
| 5,010,141 A | 4/1991 | Mueller |
| 5,034,461 A | 7/1991 | Lai et al. |
| 5,039,761 A | 8/1991 | Ono et al. |
| 5,070,170 A | 12/1991 | Robertson et al. |
| 5,070,215 A | 12/1991 | Bambury et al. |
| 5,079,319 A | 1/1992 | Mueller |
| 5,346,946 A | 9/1994 | Yokoyama et al. |
| 5,358,995 A | 10/1994 | Lai et al. |
| 5,387,632 A | 2/1995 | Lai et al. |
| 5,416,132 A | 5/1995 | Yokoyama et al. |
| 5,449,729 A | 9/1995 | Lai |
| 5,451,617 A | 9/1995 | Lai et al. |
| 5,486,579 A | 1/1996 | Lai et al. |
| 5,760,100 A | 6/1998 | Nicolson et al. |
| 5,843,346 A | 12/1998 | Morrill |
| 5,894,002 A | 4/1999 | Boneberger et al. |
| 5,962,548 A | 10/1999 | Vanderlaan et al. |

(Continued)

FOREIGN PATENT DOCUMENTS

EP  0632329 A1  1/1995

OTHER PUBLICATIONS

Greene, T. W. and Wuts, P. G. M. (1999) Protective Groups in Organic Synthesis. New York: John Wiley & Sons, Inc. [US]; pp. 518-525. (Year: 1999).*

J. Jakubiak et al., "Camphorquinone-Amines Photoinitating Systems for the Initiation of Free Radical Polymerization", Polymer 44, 2003, pp. 5219-5226.

Mohammad A. Jafar Mazumder, "Polydimethylsiloxane Substrates with Surfaces Decorated by Immobilized Hyaluronic Acids of Different Molecular Weight for Biomedical Applications", Arabian Journal for Science and Engineering, vol. 42, No. 1, 2017, pp. 271-280.

* cited by examiner

*Primary Examiner* — Michael F Pepitone
(74) *Attorney, Agent, or Firm* — Jian Zhou

(57) ABSTRACT

The present invention generally relates to silicone hydrogel contact lenses each inherently having, on lens surfaces, a relatively-high concentration of primary amino groups and to a method for producing the same. The invention is also related to silicone hydrogel contact lens precursors each inherently having, on lens surfaces, a relatively-high concentration of N-Boc-protected primary amino groups which can be easily and conveniently deprotected during lens extraction and/or hydration steps.

19 Claims, No Drawings

(56) References Cited

U.S. PATENT DOCUMENTS

| | | |
|---|---|---|
| 5,981,675 A | 11/1999 | Valint et al. |
| 6,039,913 A | 3/2000 | Hirt et al. |
| 6,166,236 A | 12/2000 | Bambury |
| 6,762,264 B2 | 7/2004 | Kuenzler et al. |
| 6,867,245 B2 | 3/2005 | Iwata et al. |
| 7,214,809 B2 | 5/2007 | Zanini et al. |
| 7,423,074 B2 | 9/2008 | Lai et al. |
| 7,605,190 B2 | 10/2009 | Moszner et al. |
| 7,915,323 B2 | 3/2011 | Awasthi et al. |
| 8,415,405 B2 | 4/2013 | Maggio |
| 8,420,711 B2 | 4/2013 | Awasthi et al. |
| 8,475,529 B2 | 7/2013 | Clarke |
| 8,480,227 B2 | 7/2013 | Qiu et al. |
| 8,529,057 B2 | 9/2013 | Qiu et al. |
| 8,614,261 B2 | 12/2013 | Iwata et al. |
| 8,658,748 B2 | 2/2014 | Liu |
| 8,993,651 B2 | 3/2015 | Chang et al. |
| 9,097,840 B2 | 8/2015 | Chang |
| 9,103,965 B2 | 8/2015 | Chang |
| 9,217,813 B2 | 12/2015 | Liu |
| 9,475,827 B2 | 10/2016 | Chang |
| 10,301,451 B2 | 5/2019 | Jing |
| 10,465,047 B2 | 11/2019 | Jing |
| 2009/0234089 A1* | 9/2009 | Ueyama ............... C08F 290/06 526/279 |
| 2010/0317816 A1* | 12/2010 | Linhardt ............... G02B 1/043 526/263 |
| 2010/0318185 A1 | 12/2010 | Nunez |
| 2012/0026457 A1 | 2/2012 | Qiu |
| 2012/0088843 A1 | 4/2012 | Chang |
| 2012/0088844 A1 | 4/2012 | Kuyu |
| 2012/0244088 A1 | 9/2012 | Saxena |
| 2012/0245249 A1 | 9/2012 | Saxena |
| 2016/0054475 A1 | 2/2016 | Wang |
| 2017/0166673 A1 | 6/2017 | Huang |
| 2018/0100038 A1 | 4/2018 | Jing |
| 2018/0100053 A1 | 4/2018 | Jing |

SILICONE HYDROGEL CONTACT LENSES

This application claims the benefit under 35 USC § 119 (e) of U.S. provisional application No. 62/635,048 filed 26 Feb. 2018, incorporated by reference in its entirety.

The present invention generally relates to silicone hydrogel contact lenses each inherently having a relatively-high concentration of amino groups on surfaces, to a method for producing the same, and to their uses in making water gradient contact lenses.

BACKGROUND

A new class of soft contact lenses, water gradient silicone hydrogel contact lenses, have been developed and successfully introduced as daily-disposable contact lenses, DAILIES® TOTAL1® (Alcon) in the market. This new class of silicone hydrogel contact lenses is characterized by having a water-gradient structural configuration, an increase from 33% to over 80% water content from core to surface (see, U.S. Pat. No. 8,480,227). This unique design can deliver a highly-lubricious and extremely-soft, water-rich lens surface that in turn provide superior wearing comfort to patients.

Such soft contact lenses can be produced according to a process described in U.S. Pat. No. 8,529,057. This process comprises step of forming an anchoring layer on each contact lens by dipping them in a coating solution of a polyanionic polymer and then a step of covalently attaching a water-soluble highly-branched hydrophilic polymeric material onto the anchoring layer directly in lens packages during autoclave. In order to improve the production efficiency, it would be desirable to eliminate the step for forming an anchor layer in the manufacturing process for producing water gradient contact lenses.

Therefore, there is still a need for a method for producing silicone hydrogel contact lenses inherently having a relatively-high surface concentration of primary amino groups which can be served as reactive anchoring sites for covalently attaching a water-soluble highly-branched hydrophilic polymeric material directly in a lens package during autoclave. There is also a need for a more efficient process for producing water gradient contact lenses.

SUMMARY OF THE INVENTION

The invention, in one aspect, provides a method for producing silicone hydrogel contact lenses each having an inherently-high concentration of amino groups on lens surfaces. The method comprises the steps of: preparing a polymerizable composition which is clear at room temperature, wherein the polymerizable composition comprises (a) at least one silicone-containing polymerizable component, wherein said at least silicone-containing polymerizable component comprises at least one silicone-containing vinylic monomer, at least one silicone-containing vinylic crosslinker, or a combination thereof, (b) at least one hydrophilic vinylic monomer, (c) a N-Boc-containing vinylic monomer having a Boc-protected amino group of —NH-Boc in which Boc is a tert-butoxycarbonyl group, (d) optionally at least one non-silicone vinylic crosslinker, and (e) at least one free radical initiator; introducing the polymerizable composition into a lens mold; curing thermally or actinically the polymerizable composition in the lens mold to form a silicone hydrogel contact lens precursor comprising N-Boc-containing repeating units of the N-Boc-containing vinylic monomer, wherein each N-Boc-containing repeating unit comprises a Boc-protected amino group of —NH-Boc; removing Boc groups from the N-Boc-containing repeating units by immersing the silicone hydrogel contact lens precursor in a liquid medium having a pH of about 4 or less for a time period sufficient to obtain the silicone hydrogel contact lenses comprising amino-containing repeating units each having a primary amino group.

The invention, in another aspect, provides a silicone hydrogel contact lens precursor, comprising a silicone hydrogel bulk material which comprises: (1) first repeating units of at least one silicone-containing polymerizable component, wherein said at least silicone-containing polymerizable component comprises at least one silicone-containing vinylic monomer, at least one silicone-containing vinylic crosslinker, or a combination thereof, (2) second repeating units of at least one hydrophilic vinylic monomer, (3) third repeating units of at least one N-Boc-containing vinylic monomer having a Boc-protected amino group of —NH-Boc in which Boc is tert-butoxycarbonyl group, and (4) optionally fourth repeating units of at least one non-silicone vinylic crosslinker.

These and other aspects of the invention will become apparent from the following description of the presently preferred embodiments. The detailed description is merely illustrative of the invention and does not limit the scope of the invention, which is defined by the appended claims and equivalents thereof.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art. Also, as used in the specification including the appended claims, reference to singular forms such as "a," "an," and "the" include the plural, and reference to a particular numerical value includes at least that particular value, unless the context clearly dictates otherwise. "About" as used herein means that a number referred to as "about" comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" or "SiHy contact lens" refers to a contact lens comprising a silicone hydrogel bulk (core) material.

A "soft contact lens" refers to a contact lens which has an elastic modulus (i.e., Young's modulus) of less than 2.5 MPa.

A "hydrogel" or "hydrogel material" refers to a crosslinked polymeric material which has three-dimensional polymer networks (i.e., polymer matrix), is insoluble in water, but can hold at least 10 percent by weight of water in its polymer matrix when it is fully hydrated.

A "silicone hydrogel" or "SiHy" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" refers to a hydrogel that is theoretically free of silicon.

"Hydrophilic," as used herein, describes a material or portion thereof that will more readily associate with water than with lipids.

A "vinylic monomer" refers to a compound that has one sole ethylenically unsaturated group, is soluble in a solvent, and can be polymerized actinically or thermally.

The term "room temperature" refers to a temperature of about 21° C. to about 27° C.

The term "soluble", in reference to a compound or material in a solvent, means that the compound or material can be dissolved in the solvent to give a solution with a concentration of at least about 0.02% by weight at room temperature.

The term "insoluble", in reference to a compound or material in a solvent, means that the compound or material can be dissolved in the solvent to give a solution with a concentration of less than 0.005% by weight at room temperature.

As used in this application, the term "ethylenically unsaturated group" is employed herein in a broad sense and is intended to encompass any groups containing at least one >C=C< group. Exemplary ethylenically unsaturated groups include without limitation (meth)acryloyl

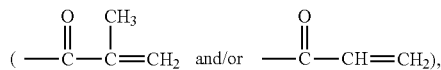

allyl, vinyl, styrenyl, or other C=C containing groups.

The term "(meth)acrylamide" refers to methacrylamide and/or acrylamide.

The term "(meth)acrylate" refers to methacrylate and/or acrylate.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which as a homopolymer typically yields a polymer that is water-soluble or can absorb at least 10 percent by weight of water.

A "hydrophobic vinylic monomer", as used herein, refers to a vinylic monomer which as a homopolymer typically yields a polymer that is insoluble in water and can absorb less than 10 percent by weight of water.

An "N-Boc-containing vinylic monomer" refers to a vinylic monomer having a Boc-protected amino group of —NH-Boc in which Boc is tert-butoxycarbonyl group.

A "primary-amino-containing vinylic monomer" refers to a vinylic monomer having an amino group of —NH$_2$.

A "blending vinylic monomer" refers to a vinylic monomer capable of dissolving both hydrophilic and hydrophobic components of a polymerizable composition to form a solution.

An "acrylic monomer" refers to a vinylic monomer having one sole (meth)acryloyl group.

An "N-vinyl amide monomer" refers to an amide compound having a vinyl group (—CH=CH$_2$) that is directly attached to the nitrogen atom of the amide group.

A "macromer" or "prepolymer" refers to a compound or polymer that has ethylenically unsaturated groups and a number average molecular weight of greater than 700 Daltons.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

As used in this application, the term "polymer" means a material formed by polymerizing one or more monomers or macromers or prepolymers or combinations thereof.

As used in this application, the term "molecular weight" of a polymeric material (including monomeric or macromeric materials) refers to the number average molecular weight unless otherwise specifically noted or unless testing conditions indicate otherwise.

A "polysiloxane segment" refers to a polymer chain consisting of at least three consecutively- and directly-linked siloxane units (divalent radical) each independent of one another having a formula of

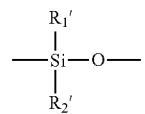

in which $R_1'$ and $R_2'$ are two substituents independently selected from the group consisting of $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, -alk-(OC$_2$H$_4$)$_{\gamma 1}$—OR° (in which alk is $C_1$-$C_6$ alkyl diradical, R° is H or $C_1$-$C_4$ alkyl and γ1 is an integer from 1 to 10), a $C_2$-$C_{40}$ organic radical having at least one functional group selected from the group consisting of hydroxyl group (—OH), carboxyl group (—COOH), —NR$_3'$R$_4'$, amino linkages of NR$_3'$—, amide linkages of —CONR$_3'$—, amide of —CONR$_3'$R$_4'$, urethane linkages of —OCONH—, and $C_1$-$C_4$ alkoxy group, or a linear hydrophilic polymer chain, in which $R_3'$ and $R_4'$ independent of each other are hydrogen or a $C_1$-$C_{15}$ alkyl.

A "polysiloxane vinylic crosslinker" refers to a compound comprising at least one polysiloxane segment and at least two ethylenically-unsaturated groups.

A "linear polysiloxane vinylic crosslinker" refers to a compound comprising a main chain which includes at least one polysiloxane segment and is terminated with one ethylenically-unsaturated group at each of the two ends of the main chain.

A "chain-extended polysiloxane vinylic crosslinker" refers to a compound comprising at least two ethylenically-unsaturated groups and at least two polysiloxane segments each pair of which is linked by one divalent radical.

A "polycarbosiloxane" refers to a compound containing at least one polycarbosiloxane segment which is a polymer chain consisting of at least three consecutively- and directly-linked siloxane units (divalent radical) each independent of one another having a formula of

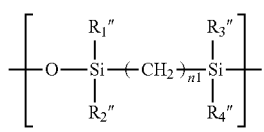

in which n1 is an integer of 2 or 3, $R_1''$, $R_2''$, $R_3''$, and $R_4''$ independent of one another are a $C_1$-$C_6$ alkyl radical (preferably methyl).

A "polycarbosiloxane vinylic monomer" refers to a compound comprising at least one polycarbosiloxane segment and one sole ethylenically-unsaturated group.

A "polycarbosiloxane vinylic crosslinker" refers to a compound comprising at least one polycarbosiloxane segment and at least two ethylenically-unsaturated groups.

The term "fluid" as used herein indicates that a material is capable of flowing like a liquid.

As used in this application, the term "clear" in reference to a polymerizable composition means that the polymerizable composition is a transparent solution or liquid mixture (i.e., having a light transmissibility of 85% or greater in the range between 400 to 700 nm).

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxyl (—OH), carboxyl (—COOH), —NH$_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

In this application the term "azetidinium" or "3-hydroxyazetidinium" refers to a positively-charged (i.e., cationic), divalent radical (or group or moiety) of

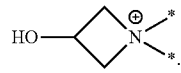

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at a temperature of from about 5° C. to about 15° C., to an extend detectable for a period of about one hour.

The term "azlactone" refers to a mono-valent radical of formula

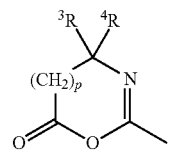

in which p is 0 or 1; $^3R$ and $^4R$ independently of each other is $C_1$-$C_8$ alkyl (preferably methyl).

The term "aziridine group" refers to a mono-valent radical of formula

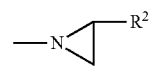

in which $R^2$ is hydrogen, methyl or ethyl.

As used in this application, the term "phosphorylcholine" refers to a zwitterionic group of

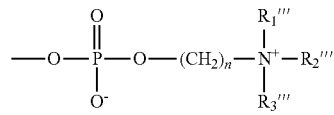

in which n is an integer of 1 to 5 and $R_1'''$, $R_2'''$ and $R_3'''$ independently of each other are $C_1$-$C_8$ alkyl or $C_1$-$C_8$ hydroxyalkyl.

The intrinsic "oxygen permeability", Dk$_i$, of a material is the rate at which oxygen will pass through a material. As used in this application, the term "oxygen permeability (Dk)" in reference to a hydrogel (silicone or non-silicone) or a contact lens means a corrected oxygen permeability (Dk$_c$) which is measured at about 34-35° C. and corrected for the surface resistance to oxygen flux caused by the boundary layer effect according to the procedures described in Example 1 of U.S. Pat. Appl. Pub. No. 2012/0026457 A1. Oxygen permeability is conventionally expressed in units of barrers, where "barrer" is defined as [(cm$^3$ oxygen)(mm)/(cm$^2$)(sec)(mm Hg)]×10$^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as [(cm$^3$ oxygen)/(cm$^2$)(sec)(mm Hg)]×10$^{-9}$.

"Ophthalmically compatible", as used herein, refers to a material or surface of a material which may be in intimate contact with the ocular environment for an extended period of time without significantly damaging the ocular environment and without significant user discomfort.

The term "modulus" or "elastic modulus" in reference to a contact lens or a material means the tensile modulus or Young's modulus which is a measure of the stiffness of a contact lens or a material. A person skilled in the art knows well how to determine the elastic modulus of a silicone hydrogel material or a contact lens. For example, all commercial contact lenses have reported values of elastic modulus. It can be measured as described in Example 1.

The invention is generally related to a process for producing SiHy contact lenses each inherently having, on lens surfaces, a relatively-high concentration of primary amino groups (—NH$_2$). This invention is partly based on the discovery that a SiHy contact lens cast-molded from a lens formulation (i.e., a polymerizable composition) including a N-Boc-containing vinylic monomer can have a surface concentration of amino groups much higher than a SiHy contact lens cast-molded from a lens formulation including an amino-containing vinylic monomer, even using a mold made of a hydrophobic material (e.g., polypropylene). It is believed that when a vinylic monomer with a primary amino group is used (e.g. aminopropylmethacrylamide, APMAm) in a silicone hydrogel lens formulation, due to the hydrophilic primary amino group, it may not be highly compatible with hydrophobic silicone-containing polymerizable components and may be less susceptible to migrate together with those silicone-containing polymerizable components to the interface between the lens formulation and a mold for cast molding (especially a hydrophobic mold, e.g., polypropylene mold). A SiHy contact lens cast molded from such a lens formulation including an amino-containing vinylic monomer may have a low surface concentration of amino groups. In contrast, when the primary amino group of the vinylic monomer is protected with a hydrophobic protective Boc group, it becomes more compatible with hydrophobic silicone-containing polymerizable components and can be more susceptible to migrate together with those silicone-containing polymerizable components to the interface between the lens formulation and the mold. The Boc-protected amino groups enriched at the lens surface can be converted into primary amino groups according to any Boc deprotection process known to a person skilled in the art. A SiHy contact lens, which is cast molded from such a lens formulation including an N-Boc-containing vinylic monomer and subjected to a Boc deprotection treatment, may have a relatively high surface concentration of amino groups. Such a SiHy contact lens having a relatively high surface concentration of primary amino groups can have a higher wettability due to the presence of the primary amino groups on the lens surface and can also be used directly in a coating process of U.S. Pat. No. 8,528,057 without need for the step of forming an anchor layer.

The invention is also partly based on the discovery that a Boc-deprotection can be advantageously carried out directly in lens extraction steps in a lens production process. Typically, SiHy contact lenses, after cast molding, need to be extracted with a liquid medium (e.g, an organic solvent, a mixture of organic solvent, a mixture of water and an organic solvent, etc.) to remove unpolymerized polymerizable components and formed oligomers. An acid (e.g., formic acid, hydrochloric acid, sulfuric acid, or the likes) can be conveniently added into the extraction medium to lower its pH to a value below about 4 or lower. During extraction with such acidified liquid medium, Boc-protected amino group can be converted to primary amino groups.

The invention, in one aspect, provides a method for producing silicone hydrogel contact lenses. The method comprises the steps of: preparing a polymerizable composition which is clear at room temperature and optionally but preferably at a temperature of from about 0 to about 4° C., wherein the polymerizable composition comprises (a) at least one silicone-containing polymerizable component, wherein said at least one silicone-containing polymerizable component comprises at least one silicone-containing vinylic monomer, at least one silicone-containing vinylic crosslinker, or a combination thereof, (b) at least one hydrophilic vinylic monomer, (c) a N-Boc-containing vinylic monomer having a Boc-protected amino group of —NH-Boc in which Boc is a tert-butoxycarbonyl group, (d) optionally at least one non-silicone vinylic crosslinker, and (e) at least one free radical initiator; introducing the polymerizable composition into a lens mold; curing thermally or actinically the polymerizable composition in the lens mold to form a silicone hydrogel contact lens precursor comprising N-Boc-containing repeating units of the N-Boc-containing vinylic monomer, wherein each N-Boc-containing repeating unit comprises a Boc-protected amino group of —NH-Boc; converting the N-Boc-containing repeating units into primary-amino-containing repeating units each having a primary amino group (—NH$_2$) by immersing the silicone hydrogel contact lens precursor in a liquid medium having a pH of about 4 or less (preferably from about 1.0 to about 4.0, more preferably from about 1.5 to about 4.0, even more preferably from about 2.0 to about 4.0) and optionally but preferably at a temperature of about 40° C. or higher (preferably from about 40° C. to about 80° C., more preferably from about 40° C. to about 70° C., even more preferably from about 40° C. to about 60° C.) for a time period sufficient to obtain a silicone hydrogel contact lens having primary amino groups thereon. Preferably, the silicone hydrogel contact lens has an oxygen permeability of at least 50 barrers, an elastic modulus of from about 0.2 MPa to about 1.5 MPa, and an equilibrium water content of from about 40% to about 70% by weight. More preferably, the silicone hydrogel contact lens has a water-break-up-time of at least 10 seconds and a water contact angle by static sessile drop of about 90 degrees or less.

In accordance with the invention, a silicone-containing vinylic monomer can be any silicone-containing vinylic monomer known to a person skilled in the art. Examples of preferred silicone-containing vinylic monomers include without limitation vinylic monomers each having a bis(trialkylsilyloxy)alkylsilyl group or a tris(trialkylsilyloxy)silyl group, polysiloxane vinylic monomers, polycarbosiloxane vinylic monomer, 3-methacryloxypropylpentamethyldisiloxane, t-butyldimethyl-siloxyethyl vinyl carbonate, trimethylsilylethyl vinyl carbonate, and trimethylsilylmethyl vinyl carbonate, and combinations thereof.

In a preferred embodiment, the silicone-containing vinylic monomer is a siloxane-containing vinylic monomer of formula (M1) or (M2)

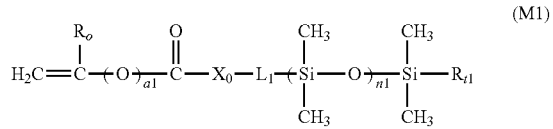

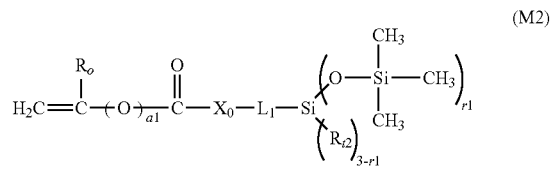

in which: a1 is zero or 1; $R_o$ is H or methyl; $X_o$ is O or $NR_1$; $L_1$ is a $C_2$-$C_8$ alkylene divalent radical or a divalent radical of -$L_1'$-$X_1$-$L_1''$-, -($C_2H_4O$)$_{q1}L_1''$-, -($C_2H_4O$)$_{q1}$CONH-$L_1''$-, -$L_1'$-NHCOO-($C_2H_4O$)$_{q1}L_1''$-, —$CH_2$—$CH(OH)$—$CH_2$—$X_1'$-($C_2H_4O$)$_{q2}L_1''$-, -$L_1'$-$X_1'$—$CH_2$—$CH(OH)$—$CH_2$—O-$L_1''$-, or -($C_2H_4O$)$_{q1}CH_2$—$CH(OH)$—$CH_2$—O-$L_1''$-; $L_1'$ is a $C_2$-$C_8$ alkylene divalent radical which has zero or one hydroxyl group; $L_1''$ is $C_3$-$C_8$ alkylene divalent radical which has zero or one hydroxyl group; $X_1$ is O, $NR_1$, NHCOO, OCONH, $CONR_1$, or $NR_1CO$; $R_1$ is H or a $C_1$-$C_4$ alkyl having 0 to 2 hydroxyl group; $R_{f1}$ and $R_{f2}$ independent of each other are a $C_1$-$C_4$ alkyl; $X_1'$ is O or $NR_1$; q1 is an integer of 1 to 20; q2 is an integer of 0 to 20; n1 is an integer of 3 to 25; and r1 is an integer of 2 or 3.

Examples of preferred siloxane-containing vinylic monomers of formula (M1) include without limitation α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth)acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-(meth)acryloxy(polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth)acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy)propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω—$C_1$-$C_4$-alkyl terminated polydimethylsiloxane, α-[3-(meth)acryloylamido-2-hydroxypropyloxypropyl] terminated ω-$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy) dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, those disclosed in U.S. Pat. Nos. 9,097,840 and 9,103,965, and mixtures thereof. The above preferred polysiloxanes vinylic monomers of formula (M1) can be obtained from commercial suppliers (e.g., Shin-Etsu, Gelest, etc.) or prepared according to procedures described in patents, e.g., U.S. Pat. Nos. 5,070,215, 6,166,236, 6,867,245, 8,415,405, 8,475,529, 8,614,261, and 9,217,813, or by reacting a hydroxyalkyl (meth)acrylate or (meth)acrylamide or a (meth)acryloxypolyethylene glycol with a mono-epoxypropyloxypropyl-terminated polydimethylsiloxane, by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane, or by reacting isocyanatoethyl (meth)acrylate with a mono-carbinol-terminated polydimethylsiloxane according to coupling reactions well known to a person skilled in the art.

Examples of preferred siloxane-containing vinylic monomers of formula (M2) include without limitation tris(trimethylsilyloxy)silylpropyl (meth)acrylate, [3-(meth)acryloxy-2-hydroxypropyloxy]propylbis(trimethylsiloxy) methylsilane, [3-(meth)acryloxy-2-hydroxypropyloxy] propylbis(trimethylsiloxy)butylsilane, 3-(meth)acryloxy-2-(2-hydroxyethoxy)-propyloxy)propylbis(trimethylsiloxy) methylsilane, 3-(meth)acryloxy-2-hydroxypropyloxy) propyltris(trimethylsiloxy)silane, N-[tris(trimethylsiloxy)silylpropyl]-(meth)acrylamide, N-(2-hydroxy-3-(3-(bis(trimethylsilyloxy)methylsilyl)propyloxy)propyl)-2-methyl (meth)acrylamide, N-(2-hydroxy-3-(3-(bis(trimethylsilyloxy)methylsilyl)propyloxy)propyl) (meth)acrylamide, N-(2-hydroxy-3-(3-(tris(trimethylsilyloxy)silyl)propyloxy) propyl)-2-methyl acrylamide, N-(2-hydroxy-3-(3-(tris(trimethylsilyloxy)silyl)propyloxy)propyl) (meth)acrylamide, N-[tris(dimethylpropylsiloxy)silylpropyl]-(meth)acrylamide, N-[tris(dimethylphenylsiloxy)silylpropyl] (meth)acrylamide, N-[tris(dimethylethylsiloxy)silylpropyl] (meth)acrylamide, N,N-bis[2-hydroxy-3-(3-(bis(trimethylsilyloxy) methylsilyl)propyloxy)propyl]-2-methyl (meth)acrylamide, N,N-bis[2-hydroxy-3-(3-(bis(trimethylsilyloxy)methylsilyl) propyloxy)propyl] (meth)acrylamide, N,N-bis[2-hydroxy-3-(3-(tris(trimethylsilyloxy)silyl)propyloxy)propyl]-2-methyl (meth)acrylamide, N,N-bis[2-hydroxy-3-(3-(tris(trimethylsilyloxy)silyl)propyloxy)propyl] (meth)acrylamide, N-[2-hydroxy-3-(3-(t-butyldimethylsilyl)propyloxy)propyl]-2-methyl (meth)acrylamide, N-[2-hydroxy-3-(3-(t-butyldimethylsilyl) propyloxy)propyl] (meth)acrylamide, N,N-bis[2-hydroxy-3-(3-(t-butyldimethylsilyl)propyloxy) propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris (trimethylsiloxy)silyl]propyl vinyl carbonate, those disclosed in U.S. Pat. Nos. 9,097,840, 9,103,965 and 9,475,827, and mixtures thereof. The above preferred silicone-containing vinylic monomers can be obtained from commercial suppliers or can be prepared according to procedures described in U.S. Pat. Nos. 5,070,215, 6,166,236, 7,214,809, 8,475,529, 8,658,748, 9,097,840, 9,103,965, and 9,475,827.

Any polycarbosiloxane vinylic monomers can be used in the invention. Examples of preferred polycarbosiloxane vinylic monomers include without limitation those disclosed in U.S. Pat. Nos. 7,915,323 and 8,420,711 and in U.S. Pat. Appl. Pub. Nos. 2012/244088A1 and 2012/245249A1.

Any suitable silicone-containing vinylic crosslinkers can be used in the invention. Examples of preferred silicone-containing vinylic crosslinkers include without limitation polysiloxane vinylic crosslinkers, polycarbosiloxane vinylic crosslinkers, and combinations thereof.

Any suitable polysiloxane vinylic crosslinkers can be used in the invention. Examples of preferred polysiloxane vinylic crosslinkers are di-(meth)acryloyl-terminated polydimethylsiloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260,725, and 4,261,875.

One class of preferred polysiloxane vinylic crosslinkers are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups as disclosed in U.S. Pat. App. Pub. No. 2017/0166673 A1, more preferably a polysiloxane vinylic crosslinker of formula (I)

$$H_2C=\underset{R_o}{\overset{}{C}}-\underset{}{\overset{O}{\overset{\|}{C}}}-X_{01}-R_{11}-\underset{CH_3}{\overset{CH_3}{\overset{|}{Si}}}-O-(\underset{CH_3}{\overset{CH_3}{\overset{|}{Si}}}-O)_{\upsilon 1}(\underset{CH_3}{\overset{R_{13}}{\overset{|}{Si}}}-O)_{\omega 1}\underset{CH_3}{\overset{CH_3}{\overset{|}{Si}}}-R_{12}-X_{01}-\underset{}{\overset{O}{\overset{\|}{C}}}-\underset{R_o}{\overset{}{C}}=CH_2 \quad (I)$$

in which:
- $\upsilon 1$ is an integer of from 30 to 500 and $\omega 1$ is an integer of from 1 to 75, provided that $\omega 1/\upsilon 1$ is from about 0.035 to about 0.15 (preferably from about 0.040 to about 0.12, even more preferably from about 0.045 to about 0.10);
- $X_{01}$ is O or $NR_N$ in which $R_N$ is hydrogen or $C_1$-$C_{10}$-alkyl;
- $R_o$ is hydrogen or methyl;
- $R_{11}$ and $R_{12}$ independently of each other are a substituted or unsubstituted $C_1$-$C_{10}$ alkylene divalent radical or a divalent radical of —$R_{14}$—O—$R_{15}$— in which $R_{14}$ and $R_{15}$ independently of each other are a substituted or unsubstituted $C_1$-$C_{10}$ alkylene divalent radical;
- $R_{13}$ is a monovalent radical of any one of formula (Ia) to (Ie)

$$-(CH_2)_{m1}-(O-CH_2)_{p1}-\underset{OH}{\overset{R_{I6}}{\overset{|}{C}}}-CH_2-X_{I1}-R_{I7}-(OH)_{m2} \quad (Ia)$$

$$-(CH_2)_{m3}-X_{I2}-R_{I8}-(OH)_{m4} \quad (Ib)$$

$$-(CH_2)_{3}-O-CH_2-\underset{R_{I9}}{\overset{CH_2OH}{\overset{|}{C}}}-CH_2OH \quad (Ic)$$

$$-(CH_2)_{3}-O-\underset{R_{I11}}{\overset{R_{I10}}{\text{(pyranose ring)}}}-OH \quad (Id)$$

$$-(CH_2)_{m1}-(O-CH_2)_{p1}-\underset{OH}{\overset{R_{I6}}{\overset{|}{C}}}-CH_2-OH \quad (Ie)$$

p1 is zero or 1; m1 is an integer of 2 to 4; m2 is an integer of 1 to 5; m3 is an integer of 3 to 6; m4 is an integer of 2 to 5;

$R_{I6}$ is hydrogen or methyl;

$R_{I7}$ is a $C_2$-$C_6$ hydrocarbon radical having (m2+1) valencies;

$R_{I8}$ is a $C_2$-$C_6$ hydrocarbon radical having (m4+1) valencies;

$R_{I9}$ is ethyl or hydroxymethyl;

$R_{I10}$ is methyl or hydromethyl;

$R_{I11}$ is hydroxyl or methoxy;

$X_{I1}$ is a sulfur linkage of —S— or a teriary amino linkage of —$NR_{I12}$— in which $R_{I12}$ is $C_1$-$C_1$ alkyl, hydroxyethyl, hydroxypropyl, or 2,3-dihydroxypropyl; and $X_{I2}$ is an amide linkage of $$-NR_{I13}-\overset{O}{\overset{\|}{C}}- \quad \text{or} \quad -\overset{O}{\overset{\|}{C}}-NR_{I13}-$$

in which $R_{I13}$ is hydrogen or $C_1$-$C_{10}$ alkyl.

A polysiloxane vinylic crosslinker of formula (I) can be prepared according to procedures described in U.S. Pat. Appl. Pub. No. 20120088843A1.

Other classes of preferred polysiloxane vinylic crosslinkers are vinylic crosslinkers of any one of formula (1) to (7)

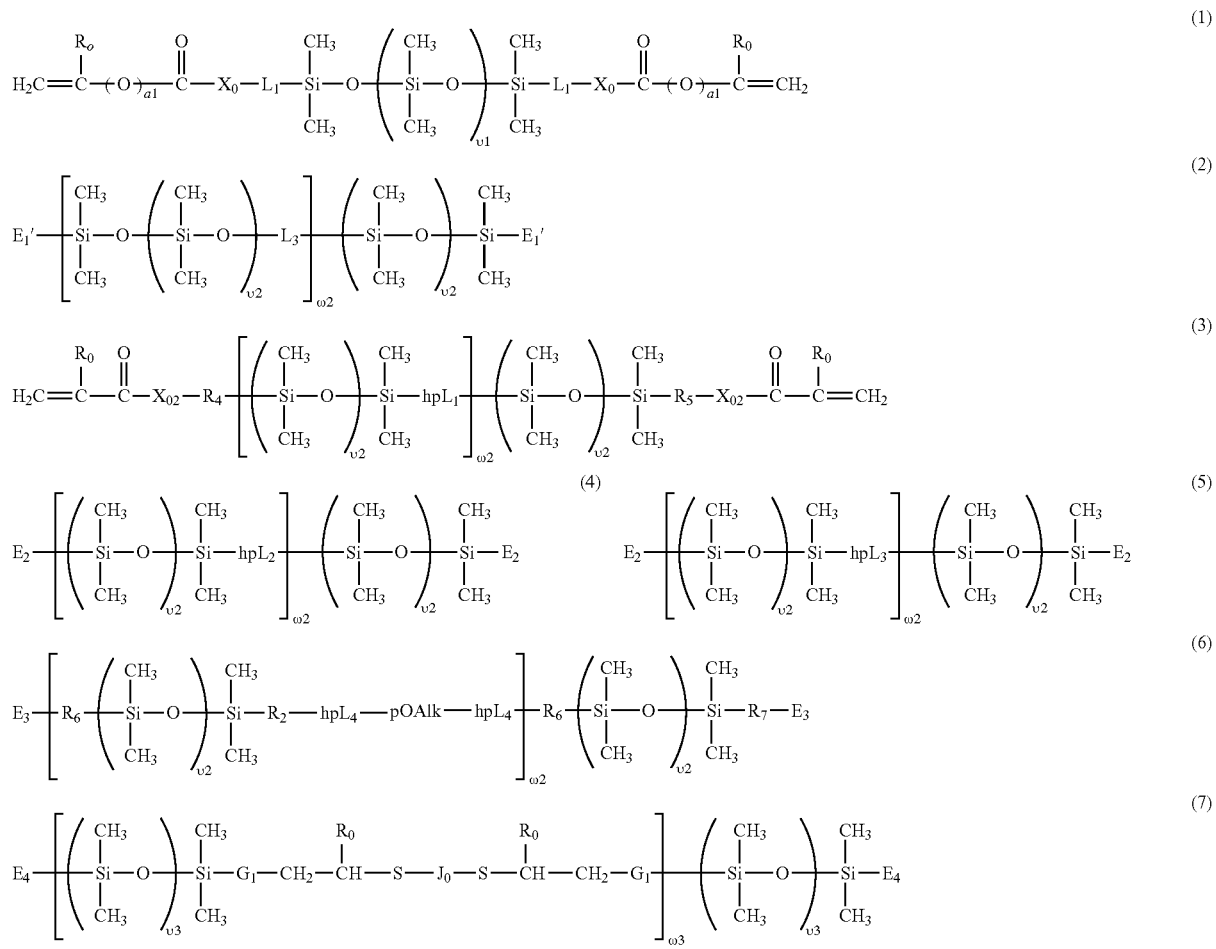

in which:
- υ1 is an integer of from 30 to 500;
- υ2 is an integer of from 5 to 50;
- υ3 is an integer of from 5 to 100;
- ω2 and ω3 independent of each other are an integer of from 1 to 15;
- a1 and g1 independent of each other is zero or 1;
- h1 is an integer of 1 to 20 and h2 is an integer of 0 to 20;
- m1 and m3 independent of each other is 0 or 1, m2 is an integer of 1 to 6, m4 is an integer of 1 to 5, m5 is 2 or 3;
- q1 is an integer of 1 to 20, q2 is an integer of 0 to 20, q3 is an integer of 0 to 2, q4 is an integer of 2 to 50, q5 and q6 independent of each other are a number of 0 to 35, provided that (q4+q5+q6) is an integer of 2 to 50;
- x+y is an integer of from 10 to 30;
- e1 is an integer of 5 to 100, p1 and b1 independent of each other are an integer of 0 to 50, provided that (e1+p1+b1)≥10 and e1/(p1+b1)≥2 (preferably from about 2:1 to about 10:1, more preferably from about 3:1 to about 6:1) when (p1+b1)≥1;
- $R_o$ is H or methyl;
- $R_1$, $R_{1n}$, $R_{2n}$, $R_{3n}$, and $R_{4n}$ independent of one another are H or a $C_1$-$C_4$ alkyl having 0 to 2 hydroxyl group;
- $R_{n5}$ is H or a $C_1$-$C_{10}$ alkyl;
- $R_2$ is a $C_4$-$C_{14}$ hydrocarbon divalent radical;
- $R_3$ is a $C_2$-$C_6$ alkylene divalent radical;
- $R_4$ and $R_5$ independent of each other are a $C_1$-$C_6$ alkylene divalent radical or a $C_1$-$C_6$ alkylene-oxy-$C_1$-$C_6$ alkylene divalent radical;
- $R_6$ and $R_7$ independent of each other are a $C_1$-$C_6$ alkylene divalent radical or a $C_1$-$C_6$ alkoxy-$C_1$-$C_6$ alkylene divalent radical;
- $R_8$ and $R_9$ independent of each other are a substituted or unsubstituted $C_1$-$C_{12}$ alkylene divalent radical;
- $X_o$, $X_1'$, $X_{o1}$, $X_{o2}$, and $X_{o3}$ independent of one another are O or $NR_1$;
- $X_1$ is O, $NR_1$, NHCOO, OCONH, $CONR_1$, or $NR_1CO$;
- $X_{o4}$ is —COO— or —$CONR_{n5}$—;
- $X_{o5}$ and $X_{o7}$ independent of each other are a direct bond, —COO— or —$CONR_{n5}$—;
- $X_{o6}$ is a direct bond, a $C_1$-$C_6$ alkylene divalent radical, a $C_1$-$C_6$ alkylenoxy divalent radical, —COO—, or —$CONR_{n5}$—;
- $X_{o8}$ is a direct bond or —COO—;
- $X_{o9}$ is O or $NR_{n5}$;
- $X_{10}$ is a direct bond, a $C_1$-$C_6$ alkylene divalent radical, —COO—, or —$CONR_{n5}$—;
- $E_1'$ is a monovalent radical of

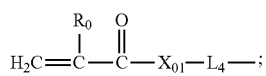

$E_2$ is a monovalent radical of

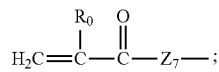

$E_3$ is a monovalent radical of

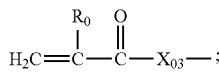

$E_4$ is a monovalent radical of

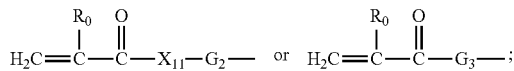

$L_1$ is a $C_2$-$C_8$ alkylene divalent radical or a divalent radical of -$L_1'$-$X_1$-$L_1''$-, $-(C_2H_4O)_{q1}L_1''$-, $-(C_2H_4O)_{q1}CONH$-$L_1''$-, -$L_1'$-NHCOO-$(C_2H_4O)_{q1}L_1''$-, —$CH_2$—$CH(OH)$—$CH_2$—$X_1'$—$(C_2H_4O)_{q2}L_1''$-, -$L_1'$-$X_1'$—$CH_2$—$CH(OH)$—$CH_2$—$O$-$L_1''$-, or $-(C_2H_4O)_{q1}CH_2$—$CH(OH)$—$CH_2$—$O$-$L_1''$-;

$L_1'$ is a $C_2$-$C_8$ alkylene divalent radical which has zero or one hydroxyl group;

$L_1''$ is $C_3$-$C_8$ alkylene divalent radical which has zero or one hydroxyl group;

$L_3$ is a divalent radical of -$L_3'$-O-$(C_2H_4O)_{q2}CONH$—$R_2$-$(NHCO$—$PE$-$CONH$—$R_2)_{g1}NHCO$—$(OC_2H_4)$-$O$-$L_3'$- in which PE is a divalent radical of $-(CH_2CH_2O)_{q3}Z_0$—$CF_2$-$(OCF_2)_x$-$(OCF_2CF_2)_y OCF_2$—$Z_0$-$(OCH_2CH_2)_{q3}$ or

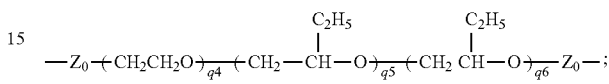

$L_3'$ is $C_3$-$C_8$ alkylene divalent radical;

$L_4$ is a divalent radical of —$C_2H_4$—$NHCO$—$O$—$(C_2H_4O)_{q2}L_3'$-, $-(C_2H_4O)_{q1}CONH$—$R_2$—$NHCO$—$O$-$(C_2H_4O)_{q2}L_3'$-, —$R_3$—$O$—$CONH$—$R_2$—$NHCO$—$O$-$(C_2H_4O)_{q2}L_3'$-, —$CH_2$—$CH(OH)$—$CH_2$—$O$-$(C_2H_4O)_{q2}L_3'$-, or $-(C_2H_4O)_{q2}L_3'$-;

$hpL_1$ is a divalent radical of

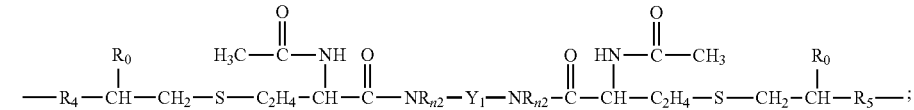

$hpL_2$ is a divalent radical of

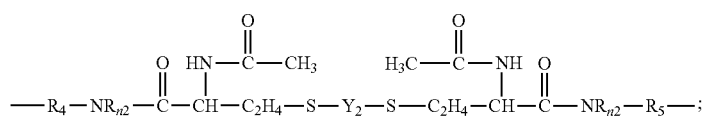

$hpL_3$ is a divalent radical of

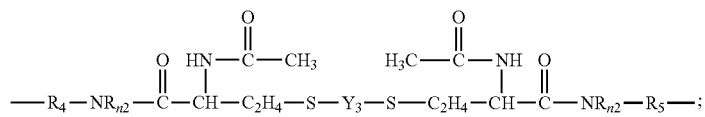

hpL$_4$ is a divalent radical of

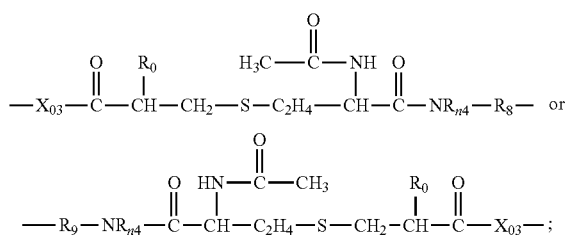

pOAlk is a divalent radical of -(EO)$_{e1}$(PO)$_{p1}$(BO)$_{b1}$— in which EO is an oxyethylene unit (—CH$_2$CH$_2$O—), PO is an oxypropylene unit

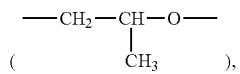

and BO is an oxybutylene unit

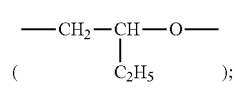

M$_0$ is C$_3$-C$_8$ alkylene divalent radical;

M$_1$ is a C$_4$-C$_{14}$ hydrocarbon divalent radical;

M$_2$ and M$_3$ independent of each other are a C$_1$-C$_6$ alkylene divalent radical;

J$_0$ is a C$_1$-C$_{12}$ hydrocarbon radical having 0 to 2 hydroxyl or carboxyl groups;

G1 is a direct bond, a C$_1$-C$_4$ alkylene divalent radical, or a bivalent radical of —X$_{04}$—(C$_2$H$_4$O—)$_{h1}$CONH-M$_1$-NHCO—O—(C$_2$H$_4$O—)$_{h2}$M$_0$-, —X$_{05}$-M$_2$-O—CONH-M$_1$-NHCO—O—(C$_2$H$_4$O—)$_{h2}$M$_0$-, X$_{06}$—CH$_2$—CH(OH)—CH$_2$—O—(C$_2$H$_4$O—)$_{h2}$M$_0$-, —X$_{07}$—(C$_2$H$_4$O—)$_{h2}$M$_0$-; —X$_{08}$-M$_3$-NHCOO—(C$_2$H$_4$O—)$_{h1}$M$_0$-, —X$_{10}$—CH$_2$—CH(OH)—CH$_2$—X$_{09}$—(C$_2$H$_4$O—)$_{h2}$M$_0$-, —X$_{07}$-M$_3$-X$_{09}$—CH$_2$—CH(OH)—CH$_2$—O-M$_0$-, or —X$_{08}$—(C$_2$H$_4$O—)$_{h1}$CH$_2$—CH(OH)—CH$_2$—O-M$_0$- in which M$_o$ is linked to Si atom while X$_{04}$ to X$_{10}$ are linked to the group of —CH$_2$— in formula (7) and at least one of J$_0$ and G1 in formula (7) comprises at least one moieties selected from the group consisting of hydroxyl groups, urethane linkage of —OCONH—, amino groups of —NHR°, amino linkages of —NH—, amide linkages of —CONH—, carboxyl groups, and combinations thereof;

G$_2$ is a C$_1$-C$_4$ alkylene divalent radical or a bivalent radical of —(C$_2$H$_4$O—)$_{h1}$CONH-M$_1$-NHCO——(C$_2$H$_4$O—)$_{h2}$M$_0$-, -M$_1$-O—CONH-M$_1$-NHCO——(C$_2$H$_4$O—)$_{h2}$M$_0$-, —CH$_2$—CH(OH)—CH$_2$—O—(C$_2$H$_4$O—)$_{h2}$M$_0$-,—(C$_2$H$_4$O—)$_2$M$_0$-; -M$_3$-NHCOO——(C$_2$H$_4$O—)$_{h1}$M$_0$-, —CH$_2$—CH(OH)—CH$_2$—X$_{09}$——(C$_2$H$_4$O—)$_{h2}$M$_0$-; -M$_3$-NHCOO—(C$_2$H$_4$O—)$_{h1}$M$_0$-, —CH$_2$—CH(OH)—CH$_2$—X$_{09}$—(C$_2$H$_4$O—)$_{h2}$M$_0$-, -M$_3$-X$_{09}$—CH$_2$—CH(OH)—CH$_2$—O-M$_0$-, or —(C$_2$H$_4$O—)$_{h1}$CH$_2$—CH(OH)—CH$_2$—O-M$_0$-;

G$_3$ is a divalent radical of

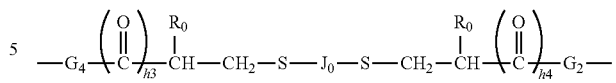

in which h3 and h4 independent of each other are 1 or 0;

G4 is a divalent radical of any one of (a) —NR$_3$'— in which R$_3$' is hydrogen or C$_1$-C$_3$ alkyl, (b)

(c) —NR$_0$-G$_5$-NR$_0$— in which G$_5$ is a C$_1$-C$_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, and (d) —O-G$_6$-O— in which G$_6$ is a C$_1$-C$_6$ alkylene divalent radical, a divalent radical of

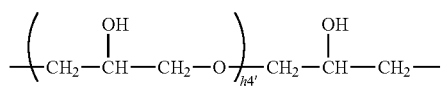

in which h4' is 1 or 2, a divalent radical of

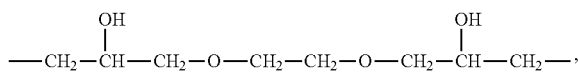

a divalent radical of —(C$_2$H$_4$O—)$_{h5}$CH$_2$—CH$_2$— in which h5 is an integer of 1 to 5, a divalent radical of

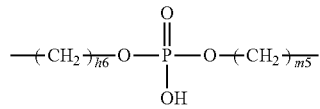

in which h6 is 2 or 3, or a substituted C$_3$-C$_8$ alkylene divalent radical having a hydroxyl group or phosphonyloxy group;

Y$_1$ is a C$_1$-C$_6$ alkylene divalent radical, 2-hydroxylpropylene divalent radical, 2-(phosphonyloxy)propylene divalent radical, 1,2-dihydroxyethylene divalent radical, a divalent radical of

or a divalent radical of

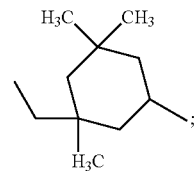

$Y_2$ is a divalent radical of

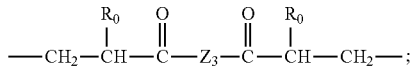

$Y_3$ is a divalent radical of

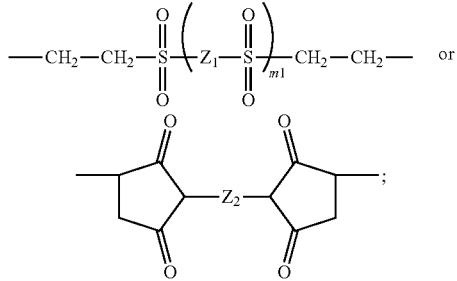

$Z_0$ is a direct bond or a $C_1$-$C_{12}$ alkylene divalent radical;
$Z_1$ is a $C_1$-$C_6$ alkylene divalent radical, a hydroxyl- or methoxy-substituted $C_1$-$C_6$ alkylene divalent radical, or a substituted or unsubstituted phenylene divalent radical,
$Z_2$ is a $C_1$-$C_6$ alkylene divalent radical, a hydroxyl- or methoxy-substituted $C_1$-$C_6$ alkylene divalent radical, a dihydroxyl- or dimethoxy-substituted $C_2$-$C_6$ alkylene divalent radical, a divalent radical of —$C_2H_4$—$(OC_2H_4)_{m2}$—, a divalent radical of —$Z_4$S—S—$Z_4$—, a hydroxyl- or methoxy-substituted $C_1$-$C_6$ alkylene divalent radical, or a substituted or unsubstituted phenylene divalent radical,
$Z_3$ is a divalent radical of any one of (a) —$NR_{n3}$—, (b)

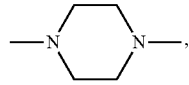

(c) —$NR_0$—$Z_5$—$NR_0$—, and (d) —O—$Z_6$—O—,
$Z_4$ is a $C_1$-$C_6$ alkylene divalent radical,
$Z_5$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical,
$Z_6$ is (a) a $C_1$-$C_6$ alkylene divalent radical, (b) a divalent radical of

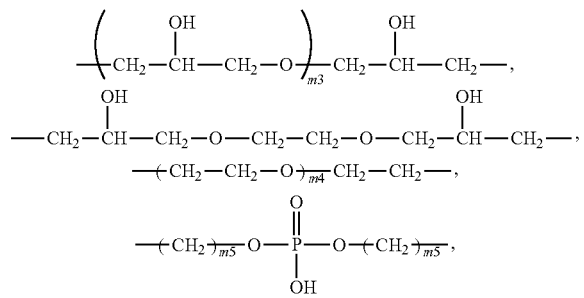

or (c) a substituted $C_3$-$C_8$ alkylene divalent radical having a hydroxyl group or phosphonyloxy group, $Z_7$ is a divalent radical of

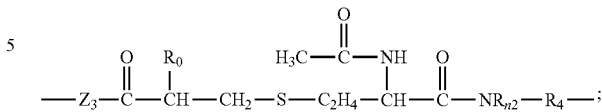

and
$Z_8$ is a divalent radical of

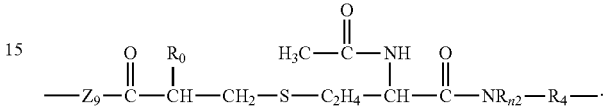

Polysiloxane vinylic crosslinkers of formula (1) can be obtained from commercial suppliers, prepared according to procedures described in US, or prepared by reacting glycidyl (meth)acrylate (meth)acryloyl chloride with a di-amino-terminated polydimethylsiloxane or a di-hydroxyl-terminated polydimethylsiloxane, reacting isocyantoethyl (meth)acrylate with di-hydroxyl-terminated polydimethylsiloxanes, reacting an amino-containing acrylic monomer with di-carboxyl-terminated polydimethylsiloxane in the presence of a coupling agent (a carbodiimide); reacting a carboxyl-containing acrylic monomer with di-amino-terminated polydimethylsiloxane in the presence of a coupling agent (a carbodiimide). Or reacting a hydroxyl-containing acrylic monomer with a di-hydroxy-terminated polydisiloxane.

Preferred examples of polysiloxane vinylic crosslinkers of formula (1) include without limitation α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy- 2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-amino-propyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, combinations thereof.

Chain-extended polysiloxane vinylic crosslinkers of formula (2) can be prepared according to the procedures described in U.S. Pat. Nos. 5,034,461, 5,416,132, 5,449,729, 5,760,100, 7,423,074, and 8,529,057. Chain-extended polysiloxane vinylic crosslinkers of formula (3), (4) or (5) can be prepared according to the procedures described in detail in U.S. Pat. App. Ser. No. 62/406,465 filed 11 Oct. 2016. Chain-extended polysiloxane vinylic crosslinkers of formula (6) can be prepared according to the procedures described in detail in U.S. Pat. App. Ser. No. 62/406,467 filed 11 Oct. 2016. Chain-extended polysiloxane vinylic crosslinkers of formula (6) can be prepared according to the procedures described in U.S. Pat. No. 8,993,651.

Another class of preferred chain-extended polysiloxane vinylic crosslinkers are those which each comprise at least two polysiloxane segments and dangling hydrophilic polymer chains each covalently attached to a divalent radical separating each pair of adjacent polysiloxane segments and having at least two pendant hydrophilic groups and/or chains as disclosed in U.S. Pat. Appl. Pub. No. 20120088843A1; those which each comprise at least two polysiloxane segments and dangling hydrophilic polymer chains each covalently attached to a divalent radical separating each pair of adjacent polysiloxane segments as disclosed in U.S. Pat. Appl. Pub. No. 20120088844A1.

Any polycarbosiloxane vinylic crosslinkers can be used in the invention. Examples of preferred polycarbosiloxane vinylic crosslinkers include without limitation those disclosed in U.S. Pat. Nos. 7,915,323 and 8,420,711 and in U.S. Pat. Appl. Pub. Nos. 2012/0244088 A1 and 2012/0245249 A1.

Any hydrophilic vinylic monomers can be used in the invention. Examples of preferred hydrophilic vinylic monomers are alkyl (meth)acrylamides (as described below), hydroxyl-containing acrylic monomers (as described below), carboxyl-containing acrylic monomers (as described below), amino-containing acrylic monomers (as described below), N-vinyl amide monomers (as described below), methylene-containing pyrrolidone monomers (i.e., pyrrolidone derivatives each having a methylene group connected to the pyrrolidone ring at 3- or 5-position) (as described below), acrylic monomers having a $C_1$-$C_4$ alkoxy-ethoxy group (as described below), vinyl ether monomers (as described below), allyl ether monomers (as described below), phosphorylcholine-containing vinylic monomers (as described below), allyl alcohol, N-2-hydroxyethyl vinyl carbamate, N-carboxyvinyl-β-alanine (VINAL), N-carboxyvinyl-α-alanine, and combinations thereof.

Examples of alkyl (meth)acrylamides includes without limitation (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

Examples of hydroxyl-containing acrylic monomers include without limitation N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol) ethyl (meth)acrylamide having a number average molecular weight of up to 1500, and combinations thereof.

Examples of amino-containing acrylic monomers include without limitation N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof.

Examples of carboxyl-containing acrylic monomers include without limitation 2-(meth)acrylamidoglycolic acid, (meth)acrylic acid, ethylacrylic acid, and combinations thereof.

Examples of preferred N-vinyl amide monomers include without limitation N-vinyl pyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

Examples of preferred methylene-containing ($=CH_2$) pyrrolidone monomers include without limitations 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

Examples of preferred acrylic monomers having a $C_1$-$C_4$ alkoxyethoxy group include without limitation ethylene glycol methyl ether (meth)acrylate, di(ethylene glycol)

methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, and combinations thereof.

Examples of preferred vinyl ether monomers include without limitation ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

Examples of preferred allyl ether monomers include without limitation ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof.

Examples of preferred phosphorylcholine-containing vinylic monomers include without limitation (meth)acryloyloxyethyl phosphorylcholine (aka, MPC, or 2-((meth)acryloyloxy)ethyl-2'-(trimethylammonio)ethylphosphate), (meth)acryloyloxypropyl phosphorylcholine (aka, 3-((meth)acryloyloxy)propyl-2'-(trimethylammonio)ethylphosphate), 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloyamino]butyl-2'-(trimethyammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethyammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2"-(trimethylammonio)ethylphosphate, and combinations thereof.

In accordance with the invention, any N-Boc-containing vinylic monomers, which have a Boc-protected amino group of —NH-Boc in which Boc is a tert-butoxycarbonyl group, can be used in the invention. Examples of preferred N-Boc-containing vinylic monomers include without limitation N-[2-(N-tert-butoxycarbonylamino)ethyl] (meth)acrylamide, N-[3-(N-tert-butoxycarbonylamino)propyl] (meth)acrylamide, 2-(N-tert-butoxycarbonylamino)ethyl (meth)acrylate, 3-(N-tert-butoxycarbonylamino)propyl (meth)acrylate, 3-(N-tert-butoxycarbonylamino)-2-hydroxypropyl (meth)acrylate, Boc-protected vinylamine, Boc-protected allylamine, and combinations thereof. A N-Boc-containing vinylic monomer can be obtained from commercial suppliers, or prepared by adding to the primary amino group of a primary-amino-containing vinylic monomer under aqueous conditions using di-tert-butyl dicarbonate in the presence of a base (e.g., Sodium bicarbonate).

In accordance with the invention, any non-silicone vinylic crosslinkers can be in this invention. Examples of preferred non-silicone vinylic cross-linking agents include without limitation ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, and combinations thereof. A preferred non-silicone vinylic cross-linking agent is tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, and combinations thereof.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-di peroxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl)peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-050), 2,4-pentanedione peroxide, dicumyl peroxide, peracetic acid, potassium persulfate, sodium persulfate, ammonium persulfate, 2,2'-azobis(4-methoxy-2,4-di methylvaleronitrile) (VAZO 33), 2,2'-Azo-bis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AlBN), 2,2'-azobis-2-methylbutyronitrile (VAZO 67), 1,1-azobis(1-cyclohexanecarbonitrile) (VAZO 88); 2,2'-azobis(2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329.

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germane-based Norrish Type I photoinitiators. Examples of benzoylphosphine initiators include 2,4,6-trimethylbenzoyl-diphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators, which can be incorporated, for example, into a macromer or can be used as a special monomer, are also suitable. Examples of reactive photoinitiators are those disclosed in EP 632 329, herein incorporated by reference in its entirety.

Where a vinylic monomer capable of absorbing ultraviolet radiation and high energy violet light (HEVL) is used in the invention, a Germane-based Norrish Type I photoinitiator and a light source including a light in the region of about 400 to about 550 nm are preferably used to initiate a free-radical polymerization. Any Germane-based Norrish Type I photoinitiators can be used in this invention, so long as they are capable of initiating a free-radical polymerization under irradiation with a light source including a light in the region of about 400 to about 550 nm. Examples of Germane-based Norrish Type I photoinitiators are acylgermanium compounds described in U.S. Pat. No. 7,605,190.

In accordance with a preferred embodiment of the invention, a polymerizable composition of the invention preferably can further comprise at least one blending vinylic monomer. Examples of preferred blending vinylic monomers include $C_1$-$C_{10}$ alkyl (meth)acrylate (e.g., methyl (meth)acrylate, ethyl (meth)acrylate, propyl (meth)acrylate, isopropyl (meth)acrylate, 2-ethylhexyl (meth)acrylate, pentyl (meth)acrylate, hexyl (meth)acrylate, etc.), cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof. Preferably, methyl methacrylate is used as a blending vinylic monomer.

In accordance with a preferred embodiment of the invention, a polymerizable composition of the invention can further comprise at least one UV-absorbing vinylic monomer and optionally (but preferably) at least one UV/HEVL-absorbing vinylic monomer. The term "UV/HEVL-absorbing vinylic monomer" refers to a vinylic monomer that can absorb UV light and high-energy-violet-light (i.e., light having wavelength between 380 nm and 440 nm.

Any suitable UV-absorbing vinylic monomers and UV/HEVL-absorbing vinylic monomers can be used in a polymerizable composition for preparing a polymer of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropyl phenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl) benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5-[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxy-propoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxy-phenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9Cl) (CAS #83063-87-0).

In a preferred embodiment, a polymerizable composition of the invention comprises a UV-absorbing vinylic monomer and a UV/HEVL absorbing vinylic monomer. More preferably, the UV-absorbing vinylic monomer is 2-[2'-hydroxy-5'-(2-methacryloxyethyl)phenyl)]-2H-benzotriazole (Norbloc), and the UV/HEVL absorbing vinylic monomer is 2-{2'-Hydroxy-3'-tert-butyl-5'-[3'-methacryloyloxy-propoxy]phenyl}-2H-benzotriazole, 2-{2'-Hydroxy-3'-tertbutyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), or combinations thereof. The resultant SiHy contact lens is characterized by having the UVB transmittance of about 10% or less (preferably about 5% or less, more preferably about 2.5% or less, even more preferably about 1% or less) between 280 and 315 nanometers and a UVA transmittance of about 30% or less (preferably about 20% or less, more preferably about 10% or less, even more preferably about 5% or less) between 315 and 380 nanometers and and a Violet transmittance of about 70% or less, preferably about 60% or less, more preferably about 50% or less, even more preferably about 40% or less) between 380 nm and 440 nm.

In accordance with the invention, a polymerizable composition of the invention comprises: (a) from about 20% to about 79% (preferably from about 20% to about 75%, more preferably from about 25% to about 70%, even more preferably from about 30% to about 65%) by weight of the silicone-containing vinylic monomer and/or the silicone-containing vinylic crosslinker; (b) 20% to about 79% (preferably from about 20% to about 75%, more preferably from about 25% to about 70%, even more preferably from about 30% to about 65%) by weight of the hydrophilic vinylic monomer; (c) from about 1% to about 15% (preferably from about 1.5% to about 12.5%, more preferably from about 2.0% to about 10%, even more preferably from about 2.5% to about 8%) by weight of the N-Boc-containing vinylic monomer; (d) from 0 to about 2.5% (preferably from 0 to about 2.0%, more preferably from about 0.01% to about 1.5%, even more preferably from about 0.05% to about 1.0%) by weight of the non-silicone vinylic crosslinker; (e) from about 0.05% to about 2.0% (preferably from about 0.1% to about 2.0%, more preferably from about 0.2% to about 1.5%, even more preferably from about 0.3% to about 1.2%) by weight of the free-radical initiator; (f) from 0 to about 25% (preferably from 0 to about 20%, more preferably from about 2.5% to about 17.5%, even more preferably from about 5% to about 15%) by weight of the blending vinylic monomer; and (g) from 0 to about 3.0%, preferably about 0.1% to about 2.5%, more preferably about 0.2% to about 2.0%, by weight of the UV-absorbing vinylic monomer and/or the UV/HEVL-absorbing vinylic monomer, relative to the total amount of all polymerizable components in the polymerizable composition, provided that the sum of the amounts of components (a) to (g) and other not-listed polymerizable components is 100%. Preferably, the sum of the amounts of components (a) to (c) is at least 70% (preferably at least 75%, more preferably at least 80, even more preferably at least 85%) by weight relative to to the total amount of all polymerizable components in the polymerizable composition.

A polymerizable composition of the invention can also comprise other necessary components known to a person skilled in the art, such as, for example, a visibility tinting agent (e.g., one or more polymerizable dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art.

The bioactive agent is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crosslinkable hydrophilic polymers (i.e., without ethylenically unsaturated groups). Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof. The number average molecular weight $M_w$ of the non-crosslinkable hydrophilic polymer is preferably from 5,000 to 1,000,000.

Examples of leachable tear-stabilizing agents include, without limitation, phospholipids, monoglycerides, diglycerides, triglycerides, glycolipids, glyceroglycolipids, sphingolipids, sphingo-glycolipids, fatty alcohols, fatty acids, mineral oils, and mixtures thereof. Preferably, a tear stabilizing agent is a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof.

A polymerizable composition (SiHy lens formulation) of the invention can be a solventless clear liquid prepared by mixing all polymerizable components and other necessary component or a solution prepared by dissolving all of the desirable components in any suitable solvent, such as, a mixture of water and one or more organic solvents miscible with water, an organic solvent, or a mixture of one or more organic solvents, as known to a person skilled in the art. The term "solvent" refers to a chemical that cannot participate in free-radical polymerization reaction.

Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711, 4,460,534, 5,843,346, and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In accordance with the invention, a mold used in the invention is preferably made of a hydrophobic polymeric material (i.e., having a water contact angle by static sessile drop method of about 100 degrees or larger), more preferably made of a polypropylene.

In accordance with the invention, the polymerizable composition can be introduced (dispensed) into a cavity formed by a mold according to any known methods.

After the polymerizable composition is dispensed into the mold, it is polymerized to produce a silicone hydrogel contact lens precursor. Crosslinking may be initiated thermally or actinically to crosslink the polymerizable components in the polymerizable composition.

The thermal polymerization is carried out conveniently in an above-mentioned solvent at elevated temperature, for example at a temperature of from 25 to 100° C. and preferably 40 to 100° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere.

The actinic polymerization can then be triggered off by actinic radiation, for example light, in particular UV light or visible light of a suitable wavelength. The spectral requirements can be controlled accordingly, if appropriate, by addition of suitable photosensitizers.

Opening of the mold so that the molded article (i.e., the silicone hydrogel contact lens precursor) can be removed from the mold may take place in a manner known per se.

In accordance with the invention, the liquid medium having a pH of about 4 or less is acidified water, an aqueous solution, an acidified mixture of water with one or more organic solvents miscible with water, an acidified organic solvent, or an acified mixture of one or more organic solvents. Any organic solvents described above can be used in the invention. Preferably, the organic solvents used in the invention are 1,2-propylene glycol, a polyethyleneglycol having a number average molecular weight of about 400 Daltons or less, a $C_1$-$C_6$ alkylalcohol, or combination thereof. Any acids can be used in acidifying the liquid medium. Preferably, formic acid, hydrochloric acid, sulfuric acid, or a combination thereof is used to acidify the liquid medium.

Typically, molded contact lenses need to be extracted with an extraction solvent to remove unpolymerized polymerizable components. In accordance with a preferred embodiment, the extraction solvent is the liquid medium for converting N-Boc-containing repeating units to primary-amino-containing repeating units.

In accordance with the invention, the step of converting N-Boc-containing repeating units to primary-amino-containing repeating units can be carried out preferably at a temperature of about 40° C. or higher (preferably from about 40° C. to about 80° C., more preferably from about 20° C. to about 70° C., even more preferably from about 40° C. to about 60° C.).

The resultant silicone hydrogel contact lens having primary amino groups thereon can further subject to further processes, such as, for example, hydration, packaging in lens packages with a packaging solution which is well known to a person skilled in the art; sterilization such as autoclave at from 118 to 124° C. for at least about 30 minutes; and the like.

In a preferred embodiment, a method of the invention further comprises a step of covalently attaching a hydrophilic polymeric material onto the silicone hydrogel contact lens having primary amino groups thereon to form a silicone hydrogel contact lens with a coating of the hydrophilic polymeric material thereon, wherein the hydrophilic polymeric material comprises one or more reactive functional groups each coreactive with one primary amino group on the surface of the SiHy contact lens to form a covalent linkage in the absence or presence of a coupling agent. Examples of preferred reactive functional groups include without limitation azetidinium groups, epoxy groups, aziridine group, N-hydroxysuccinimide ester, carboxyl groups, acid halide group, acid anhydrate group, aldehyde group, azlactone group, isocyanate group, and combinations thereof.

Non-limiting examples of coupling reactions under various reaction conditions between a primary amino group and one co-reactive functional group are given below for illustrative purposes. amino group (—NH₂) reacts with an azetidinium group

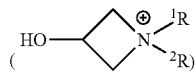

to form a linkage (¹R²RN—CH₂—CH(OH)—CH₂—NH—) at an temperature of from about 40° C. to 140° C.; an amino group NH₂ reacts with an epoxy or aziridine group to form an amine bond (—C—NH—); an amino group —NH₂ reacts with a N-hydroxysuccinimide ester group to form an amide linkage; an amino group —NH₂ reacts with a carboxylic acid group in the presence of a coupling agent carbodiimide (e.g., 1-ethyl-3-(3-dimethylaminopropyl) carbodiimide (EDC), N,N'-dicyclohexylcarbodiimide (DCC), 1-cylcohexyl-3-(2-morpholinoethyl)carbodiimide, diisopropyl carbodiimide, or mixtures thereof) and N-hydroxysuccinimide to form an amide linkage; an amino group NH₂ reacts with an acid chloride or bromide group or with an acid anhydride group to form an amide linkage (—CO—NH—); an amino group reacts with aldehyde group to form a Schiff base which may further be reduced; an amino group NH₂ reacts (ring-opening) with an azlactone group to form an alkylenediamido linkage (—C(O)NH-alkylene-C(O)NH—); and an amino group NH₂ reacts with an isocyanate group to form a urea linkage (—NH—C(O)—NH—).

Preferably, the step of covalently attaching a hydrophilic polymeric material to the silicone hydrogel contact lens is performed by autoclaving the silicone hydrogel contact lens having primary amino groups thereon which is immersed in a packaging solution (i.e., a buffered aqueous solution with a pH of from 6.7 to 7.6) in a sealed lens package at a temperature of from about 115° C. to about 125° C. for approximately 20-90 minutes, wherein the packaging solution comprises at least 0.01% (preferably from about 0.05% to about 2%, more preferably from about 0.05% to about 1.5%, even more preferably from about 0.1% to about 1.5%, most preferably from about 0.2% to about 1.0%, by weight of the hydrophilic polymeric material which have azetidinium groups. It is believed that during autoclave those azetidinium groups which do not participate in crosslinking reaction may be hydrolyzed into 2,3-dihydroxypropyl (HO—CH₂—CH(OH)—CH₂—) groups and that the azetidinium-containing polymeric material present in the lens packaging solution, if applicable, can be converted to a non-reactive polymeric wetting agent capable of improving a lens's insert comfort. Consequently, the second aqueous coating solution is ophthalmically safe after autoclave.

Examples of preferred hydrophilic polymeric materials having azetidinium groups are those described in U.S. Pat. No. 8,480,227.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

The packaging solution contains a buffering agent in an amount sufficient to maintain a pH of the packaging solution in the desired range, for example, preferably in a physiologically acceptable range of about 6.5 to about 7.5. Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (i.e., 2-amino-2-hydroxymethyl-1,3-propanediol), Bis-Tris [i.e., Bis-(2-hydroxyethyl)-imino-tris-(hydroxymethyl)-methane], Bis-Tris propane [i.e., 1,3-bis(tris(hydroxymethyl)methylamino)propane], bis-aminopolyols, triethanolamine, ACES [i.e., N-(2-hydroxyethyl)-2-aminoethanesulfonic acid], BES [i.e., N,N-Bis(2-hydroxyethyl)-2-aminoethanesulfonic acid], HEPES [i.e., 4-(2-hydroxyethyl)-1-piperazineethanesulfonic acid], MES [i.e., 2-(N-morpholino)ethanesulfonic acid], MOPS [i.e., 3-[N-morpholino]-propanesulfonic acid], PIPES [i.e., piperazine-N,N'-bis(2-ethanesulfonic acid], TES {i.e., N-[Tris(hydroxymethyl)methyl]-2-aminoethanesulfonic acid}, salts thereof, phosphate buffers, e.g. Na₂HPO₄, NaH₂PO₄, and KH₂PO₄ or mixtures thereof. The amount of each buffer agent in a packaging solution is preferably from 0.001% to 2%, preferably from 0.01% to 1%; most preferably from about 0.05% to about 0.30% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly acceptable tonicity agents include, but are not limited to sodium chloride, potassium chloride, glycerol, propylene glycol, polyols, mannitol, sorbitol, xylitol and mixtures thereof.

A packaging solution of the invention has a viscosity of from about 1 centipoise to about 5 centipoises, at 25° C.

The invention, in another aspect, provides a silicone hydrogel contact lens precursor, comprising a silicone hydrogel bulk material which comprises: (1) from about 20% to about 79% (preferably from about 20% to about 75%, more preferably from about 25% to about 70%, even more preferably from about 30% to about 65%) by weight of first repeating units of at least one silicone-containing vinylic monomer and/or at least one silicone-containing vinylic crosslinker; (2) from 20% to about 79% (preferably from about 20% to about 75%, more preferably from about 25% to about 70%, even more preferably from about 30% to about 65%) by weight of second repeating units of at least one hydrophilic vinylic monomer; (3) from about 1% to about 15% (preferably from about 1.5% to about 12.5%, more preferably from about 2.0% to about 10%, even more preferably from about 2.5% to about 8%) by weight of third repeating units of at least one N-Boc-containing vinylic monomer; (4) from 0 to about 2.5% (preferably from 0 to about 2.0%, more preferably from about 0.01% to about 1.5%, even more preferably from about 0.05% to about 1.0%) by weight of fourth repeat units of at least one non-silicone vinylic crosslinker; (5) from 0 to about 25% (preferably from 0 to about 20%, more preferably from about 2.5% to about 17.5%, even more preferably from about 5% to about 15%) by weight of fifth repeating units of at least one blending vinylic monomer; and (6) from 0 to about 3.0%, preferably about 0.1% to about 2.5%, more preferably about 0.2% to about 2.0%, by weight of sixth repeating units of at least one UV-absorbing vinylic monomer and/or at least one UV/HEVL-absorbing vinylic monomer, relative to the dried weight of the silicone hydrogel contact lens precursor. Preferably, the sum of the amounts of repeating units (a) to (c) is at least 70% (preferably at least 75%, more preferably at least 80%, even more preferably at least 85%) by weight relative to the dried weight of the silicone hydrogel contact lens precursor.

In accordance with the invention, the amounts (weight percentage) of the first to sixth repeating units are calculated based on the amounts of said at least one silicone-containing vinylic monomer, said at least one silicone-containing vinylic crosslinker, said at least one hydrophilic vinylic monomer, said at least one N-Boc-containing vinylic monomer, said at least one non-silicone vinylic crosslinker, said at least one blending vinylic monomer, said at least one UV-absorbing vinylic monomer, and said at least one UV/HEVL-absorbing vinylic monomer present in a polymerizable composition for making a silicone hydrogel contact lens precursor of the invention.

Various embodiments described above of silicone-containing vinylic monomers, silicone-containing vinylic crosslinkers, hydrophilic vinylic monomers, N-Boc-containing vinylic monomers, non-silicone vinylic crosslinkers, blending vinylic monomers, UV-absorbing vinylic monomers, and UV/HEVL-absorbing vinylic monomers should be incorporated into this aspect of the invention.

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

1. A contact lens precursor, comprising a silicone hydrogel bulk material which comprises:
   (1) from about 20% to about 79% by weight of first repeating units of at least one silicone-containing polymerizable component, wherein said at least one silicone-containing polymerizable component comprises at least one silicone-containing vinylic monomer, at least one silicone-containing vinylic crosslinker, or a combination thereof;
   (2) from 20% to about 79% by weight of second repeating units of at least one hydrophilic vinylic monomer;
   (3) from about 1% to about 15% by weight of third repeating units of at least one N-Boc-containing vinylic monomer;
   (4) from 0 to about 2.5% by weight of fourth repeat units of at least one non-silicone vinylic crosslinker;
   (5) from 0 to about 25% by weight of fifth repeating units of at least one blending vinylic monomer; and
   (6) from 0 to about 3.0% by weight of sixth repeating units of at least one UV-absorbing vinylic monomer and/or at least one UV/HEVL-absorbing vinylic monomer.
2. The contact lens precursor of embodiment 1, wherein the sum of the amounts of repeating units (a) to (c) present in the silicone hydrogel bulk material is at least 70% by weight.
3. The contact lens precursor of embodiment 1, wherein the sum of the amounts of repeating units (a) to (c) present in the silicone hydrogel bulk material is at least 75% by weight.
4. The contact lens precursor of embodiment 1, wherein the sum of the amounts of repeating units (a) to (c) present in the silicone hydrogel bulk material is at least 80% by weight.
5. The contact lens precursor of embodiment 1, wherein the sum of the amounts of repeating units (a) to (c) present in the silicone hydrogel bulk material is at least at least 85% by weight.
6. The contact lens precursor of any one of embodiments 1 to 5, wherein the silicone hydrogel bulk material comprises from about 20% to about 75% by weight of the first repeating units of said at least one silicone-containing vinylic monomer and/or said at least one silicone-containing vinylic crosslinker.
7. The contact lens precursor of any one of embodiments 1 to 5, wherein the silicone hydrogel bulk material comprises from about 25% to about 70% by weight of the first repeating units.
8. The contact lens precursor of any one of embodiments 1 to 5, wherein the silicone hydrogel bulk material comprises from about 30% to about 65% by weight of the first repeating units.
9. The contact lens precursor of any one of embodiments 1 to 8, wherein the silicone hydrogel bulk material comprises from about 20% to about 75% by weight of the second repeating units of said at least one silicone-containing vinylic monomer and/or said at least one silicone-containing vinylic crosslinker.
10. The contact lens precursor of any one of embodiments 1 to 9, wherein the silicone hydrogel bulk material comprises from about 25% to about 70% by weight of the second repeating units.
11. The contact lens precursor of any one of embodiments 1 to 9, wherein the silicone hydrogel bulk material comprises from about 30% to about 65% by weight of the second repeating units.
12. The contact lens precursor of any one of embodiments 1 to 11, wherein the silicone hydrogel bulk material comprises from about 1.5% to about 12.5% by weight of the third repeating units.
13. The contact lens precursor of any one of embodiments 1 to 11, wherein the silicone hydrogel bulk material comprises from about 2.0% to about 10% by weight of the third repeating units.
14. The contact lens precursor of any one of embodiments 1 to 11, wherein the silicone hydrogel bulk material comprises from about 2.5% to about 8% by weight of the third repeating units.
15. The contact lens precursor of any one of embodiments 1 to 14, wherein the silicone hydrogel bulk material comprises from 0 to about 2.0% by weight of the fourth repeating units.
16. The contact lens precursor of any one of embodiments 1 to 14, wherein the silicone hydrogel bulk material comprises from about 0.01% to about 1.5% by weight of the fourth repeating units.
17. The contact lens precursor of any one of embodiments 1 to 14, wherein the silicone hydrogel bulk material comprises from about 0.05% to about 1.0% by weight of the fourth repeating units.

18. The contact lens precursor of any one of embodiments 1 to 17, wherein the silicone hydrogel bulk material comprises from 0 to about 20% by weight of the fifth repeating units.

19. The contact lens precursor of any one of embodiments 1 to 17, wherein the silicone hydrogel bulk material comprises from about 2.5% to about 17.5% by weight of the fifth repeating units.

20. The contact lens precursor of any one of embodiments 1 to 17, wherein the silicone hydrogel bulk material comprises from about 5% to about 15% by weight of the fifth repeating units.

21. The contact lens precursor of any one of embodiments 1 to 20, wherein the silicone hydrogel bulk material comprises from about 0.1% to about 2.5% by weight of the sixth repeating units.

22. The contact lens precursor of any one of embodiments 1 to 20, wherein the silicone hydrogel bulk material comprises from about 0.2% to about 2.0% by weight of the sixth repeating units.

23. A method for producing silicone hydrogel contact lenses, comprising the steps of:
  (1) preparing a polymerizable composition which is clear at room temperature, wherein the polymerizable composition comprises
    (a) from about 20% to about 79% by weight of at least one silicone-containing polymerizable component, wherein said at least one silicone-containing polymerizable component comprises at least one silicone-containing vinylic monomer, at least one silicone-containing vinylic crosslinker, or a combination thereof,
    (b) 20% to about 79% by weight of at least one hydrophilic vinylic monomer,
    (c) from about 1% to about 15% by weight of at least one N-Boc-containing vinylic monomer,
    (d) from 0 to about 2.5% by weight of a non-silicone vinylic crosslinker,
    (e) from about 0.05% to about 2.0% by weight of a free-radical initiator,
    (f) from 0 to about 25% by weight of at least one blending vinylic monomer, and
    (g) from 0 to about 3.0% by weight of at least one UV-absorbing vinylic monomer and/or at least one UV/HEVL-absorbing vinylic monomer,
    relative to the total amount of all polymerizable components in the polymerizable composition, provided that the sum of the amounts of components (a) to (g) and other not-listed polymerizable components is 100%;
  (2) introducing the polymerizable composition into a lens mold;
  (3) curing thermally or actinically the polymerizable composition in the lens mold to form a silicone hydrogel contact lens precursor comprising N-Boc-containing repeating units of the N-Boc-containing vinylic monomer, wherein each N-Boc-containing repeating unit comprises a Boc-protected amino group of —NH-Boc; and
  (4) converting the N-Boc-containing repeating units into primary-amino-containing repeating units each having a primary amino group —(NH$_2$) by immersing the silicone hydrogel contact lens precursor in a liquid medium having a pH of about 4 or less for a time period sufficient to obtain a silicone hydrogel contact lens having primary amino groups thereon.

24. The method of embodiment 23, wherein the lens mold is made of a hydrophobic polymeric material.

25. The method of embodiment 23, wherein the lens mold is made of a polypropylene.

26. The method of any one of embodiments 23 to 25, wherein liquid medium having a pH of from 1.0 to about 4.0.

27. The method of any one of embodiments 23 to 25, wherein liquid medium having a pH of from about 1.5 to about 4.0.

28. The method of any one of embodiments 23 to 25, wherein liquid medium having a pH of from about 2.0 to about 4.0.

29. The method of any one of embodiments 23 to 28, wherein the liquid medium is acidified water, an aqueous solution, an acidified mixture of water with one or more organic solvents miscible with water, an acidified organic solvent, or an acified mixture of organic solvents.

30. The method of any one of embodiments 23 to 28, wherein the liquid medium is an acidified water.

31. The method of any one of embodiments 23 to 28, wherein the liquid medium is an aqueous solution.

32. The method of any one of embodiments 23 to 28, wherein the liquid medium is an acidified mixture of water with one or more organic solvents selected from the group consisting of 1,2-propylene glycol, a polyethyleneglycol having a number average molecular weight of about 400 Daltons or less, a $C_1$-$C_6$ alkylalcohol, or combination thereof.

33. The method of any one of embodiments 23 to 28, wherein the liquid medium is an acidified organic solvent selected from the group consisting of 1,2-propylene glycol, a polyethyleneglycol having a number average molecular weight of about 400 Daltons or less, a $C_1$-$C_6$ alkylalcohol, or combination thereof.

34. The method of any one of embodiments 23 to 28, wherein the liquid medium is an acidified mixture of one or more organic solvents selected from the group consisting of 1,2-propylene glycol, a polyethyleneglycol having a number average molecular weight of about 400 Daltons or less, a $C_1$-$C_6$ alkylalcohol, or combination thereof.

35. The method of any one of embodiments 23 to 34, wherein the liquid medium is acidified with formic acid, hydrochloric acid, sulfuric acid, or a combination thereof.

36. The method of any one of embodiments 23 to 35, wherein the step of converting N-Boc-containing repeating units to primary-amino-containing repeating units is carried out at a temperature of from about 40° C. to about 80° C.

37. The method of any one of embodiments 23 to 35, wherein the step of converting N-Boc-containing repeating units to primary-amino-containing repeating units is carried out at a temperature of from about 40° C. to about 70° C.

38. The method of any one of embodiments 23 to 35, wherein the step of converting N-Boc-containing repeating units to primary-amino-containing repeating units is carried out at a temperature of from about 40° C. to about 60° C.

39. The method of any one of embodiments 23 to 38, further comprising a step of covalently attaching a hydrophilic polymeric material onto the silicone hydrogel contact lens having primary amino groups thereon to form a silicone hydrogel contact lens with a coating of the hydrophilic polymeric material thereon, wherein the hydrophilic polymeric material comprises one or more reactive functional groups each coreactive with one primary amino group on the surface of the SiHy contact lens to form a covalent linkage in the absence or presence of a coupling agent.

40. The method of embodiment 39, wherein the reactive functional groups are azetidinium groups, epoxy groups, or combinations thereof.

41. The method of embodiment 39, wherein the reactive functional groups are aziridine group, N-hydroxysuccinimide ester, carboxyl groups, acid halide group, acid anhydrate group, aldehyde group, azlactone group, isocyanate group, or combinations thereof.

42. The method of embodiment 40 or 41, wherein the step of covalently attaching the hydrophilic polymeric material to the silicone hydrogel contact lens is performed by autoclaving the silicone hydrogel contact lens having primary amino groups thereon which is immersed in a packaging solution in a sealed lens package at a temperature of from about 115° C. to about 125° C. for 20 to 90 minutes, wherein the packaging solution comprises at least 0.01% by weight of the hydrophilic polymeric material.

43. The method of embodiment 42, wherein the packaging solution comprises from about 0.05% to about 2.0% by weight of the hydrophilic polymeric material.

44. The method of embodiment 42, wherein the packaging solution comprises from about 0.1% to about 1.5% by weight of the hydrophilic polymeric material.

45. The method of embodiment 42, wherein the packaging solution comprises from about 0.2% to about 1.0% by weight of the hydrophilic polymeric material.

46. The method of any one of embodiments 42 to 45, wherein the hydrophilic polymeric material comprises azetidinium groups.

47. The method of any one of embodiments 23 to 46, wherein the polymerizable composition comprises from about 20% to about 75% by weight of said at least one silicone-containing polymerizable component.

48. The method of any one of embodiments 23 to 46, wherein the polymerizable composition comprises from about 25% to about 70% by weight of said at least one silicone-containing polymerizable component.

49. The method of any one of embodiments 23 to 46, wherein the polymerizable composition comprises from about 30% to about 65% by weight of said at least one silicone-containing polymerizable component.

50. The method of any one of embodiments 23 to 49, wherein the polymerizable composition comprises from about 20% to about 75% by weight of said at least one hydrophilic vinylic monomer.

51. The method of any one of embodiments 23 to 49, wherein the polymerizable composition comprises from about 25% to about 70% by weight of said at least one hydrophilic vinylic monomer.

52. The method of any one of embodiments 23 to 49, wherein the polymerizable composition comprises from about 30% to about 65% by weight of said at least one hydrophilic vinylic monomer.

53. The method of any one of embodiments 23 to 52, wherein the polymerizable composition comprises from about 1.5% to about 12.5% by weight of said at least one N-Boc-containing vinylic monomer.

54. The method of any one of embodiments 23 to 52, wherein the polymerizable composition comprises from about 2.0% to about 10% by weight of said at least one N-Boc-containing vinylic monomer.

55. The method of any one of embodiments 23 to 52, wherein the polymerizable composition comprises from about 2.5% to about 8% by weight of said at least one N-Boc-containing vinylic monomer.

56. The method of any one of embodiments 23 to 55, wherein the polymerizable composition comprises from 0 to about 2.0% by weight of the non-silicone vinylic crosslinker.

57. The method of any one of embodiments 23 to 55, wherein the polymerizable composition comprises from about 0.01% to about 1.5% by weight of the non-silicone vinylic crosslinker.

58. The method of any one of embodiments 23 to 55, wherein the polymerizable composition comprises from about 0.05% to about 1.0% by weight of the non-silicone vinylic crosslinker.

59. The method of any one of embodiments 23 to 58, wherein the polymerizable composition comprises from about 0.1% to about 2.0% by weight of the free-radical initiator.

60. The method of any one of embodiments 23 to 58, wherein the polymerizable composition comprises from about 0.2% to about 1.5% by weight of the free-radical initiator.

61. The method of any one of embodiments 23 to 58, wherein the polymerizable composition comprises from about 0.3% to about 1.2% by weight of the free-radical initiator.

62. The method of any one of embodiments 23 to 61, wherein the polymerizable composition comprises from 0 to about 20% by weight of said at least one blending vinylic monomer.

63. The method of any one of embodiments 23 to 61, wherein the polymerizable composition comprises from about 2.5% to about 17.5% by weight of said at least one blending vinylic monomer.

64. The method of any one of embodiments 23 to 61, wherein the polymerizable composition comprises from about 5% to about 15% by weight of said at least one blending vinylic monomer.

65. The method of any one of embodiments 23 to 64, wherein the polymerizable composition comprises from about 0.1% to about 2.5% by weight of said at least one UV-absorbing vinylic monomer and/or said at least one UV/HEVL-absorbing vinylic monomer.

66. The method of any one of embodiments 23 to 64, wherein the polymerizable composition comprises from about 0.2% to about 2.0% by weight of said at least one UV-absorbing vinylic monomer and/or said at least one UV/HEVL-absorbing vinylic monomer.

67. The contact lens precursor of any one of embodiments 1 to 22 or the method of any one of embodiments 23 to 66, wherein said at least one silicone-containing polymerizable component comprises at least one silicone containing vinylic monomer.

68. The contact lens precursor or the method of embodiment 67, wherein said at least one silicone-containing vinylic monomer is a vinylic monomer having a bis(trialkylsilyloxy)alkylsilyl group or a tris(trialkylsilyloxy)silyl group, a polysiloxane vinylic monomer, a polycarbosiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

69. The contact lens precursor or the method of embodiment 67, wherein said at least one silicone-containing vinylic monomer is a vinylic monomer of formula (M1) or (M2)

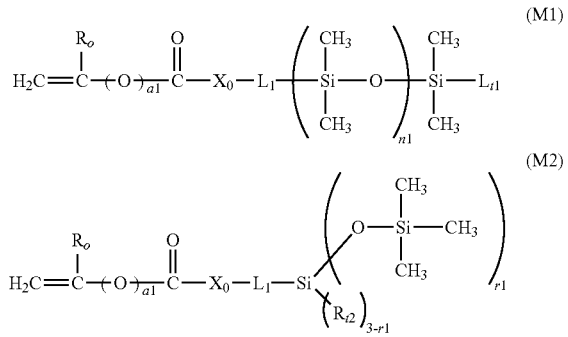

(M1)

(M2)

in which: a1 is zero or 1; $R_o$ is H or methyl; $X_o$ is O or $NR_1$; $L_1$ is a $C_2$-$C_8$ alkylene divalent) radical or a divalent radical of -$L_1'$-$X_1$-$L_1''$-, -$(C_2H_4O)_{q1}L_1''$-, -$(C_2H_4O)_{q1}$CONH-$L_1''$-, -$L_1'$-NHCOO-$(C_2H_4O)_{q1}L_1''$-, —$CH_2$—CH(OH)—$CH_2$—$X_1'$-($C_2H_4O)_{q2}L_1''$-, -$L_1'$-$X_1'$—$CH_2$—CH(OH)—$CH_2$—O-$L_1''$-, or -$(C_2H_4O)_{q1}CH_2$—CH(OH)—$CH_2$—O-$L_1''$; $L_1'$ is a $C_2$-$C_8$ alkylene divalent radical which has zero or one hydroxyl group; $L_1''$ is $C_3$-$C_8$ alkylene divalent radical which has zero or one hydroxyl group; $X_1$ is O, $NR_1$, NHCOO, OCONH, $CONR_1$, or $NR_1CO$; $R_1$ is H or a $C_1$-$C_4$ alkyl having 0 to 2 hydroxyl group; $R_{t1}$ and $R_{1t}$ independent of each other are a $C_1$-$C_4$ alkyl; $X_1'$ is O or $NR_1$; q1 is an integer of 1 to 20; q2 is an integer of 0 to 20; n1 is an integer of 3 to 25; and r1 is an integer of 2 or 3.

70. The contact lens precursor or the method of embodiment 69, wherein said at least one silicone-containing vinylic monomer is tris(trimethylsilyloxy)silylpropyl (meth)acrylate, [3-(meth)acryloxy-2-hydroxypropyloxy]propylbis(trimethylsiloxy)methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris(trimethylsiloxy)silane, N-[tris(trimethylsilyoxy)silylpropyl]-(meth)acrylamide, N-(2-hydroxy-3-(3-(bis(trimethylsilyloxy)methylsilyl)propyloxy)propyl)-2-methyl (meth)acrylamide, N-(2-hydroxy-3-(3-(bis(trimethylsilyloxy)methylsilyl)propyloxy)-propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl) (meth)acrylamide, N-[tris(dimethylpropylsiloxy)silylpropyl]-(meth)acrylamide, N-[tris(dimethylphenylsiloxy)silylpropyl] (meth)acrylamide, N-[tris(dimethylethylsiloxy)-silylpropyl] (meth)acrylamide, N,N-bis[2-hydroxy-3-(3-(bis(trimethylsilyloxy)methylsilyl)-propyloxy)propyl]-2-methyl (meth)acrylamide, N,N-bis[2-hydroxy-3-(3-(bis(trimethylsilyloxy)methylsilyl)propyloxy)propyl] (meth)acrylamide, N,N-bis[2-hydroxy-3-(3-(tris(trimethylsilyloxy)silyl)propyloxy)propyl]-2-methyl (meth)acrylamide, N,N-bis[2-hydroxy-3-(3-(tris(trimethylsilyloxy)silyl)propyloxy)propyl] (meth)acrylamide, N-[2-hydroxy-3-(3-(t-butyldimethylsilyl)propyloxy)propyl]-2-methyl (meth)acrylamide, N-[2-hydroxy-3-(3-(t-butyldimethylsilyl)propyloxy)propyl] (meth)acrylamide, N,N-bis[2-hydroxy-3-(3-(t-butyldimethylsilyl)propyloxy)propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, or a combination thereof.

71. The contact lens precursor or the method of embodiment 67, wherein said at least one silicone-containing vinylic monomer is α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω—$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxypropyloxy-2-hydroxypropyloxypropyl]-terminated ω-$C_1$-$C_4$-alkyl terminated polydimethylsiloxane, α-[3-(meth)acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[$_3$-(meth)acryloxy-butylamino-2-hydroxypropyloxypropylHerminated ω-$C_1$-$C_4$-alkyl terminated polydimethylsiloxane, α-(meth)acryloxy (polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth)acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxpropyloxy-(polyethylenoxy)propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl] terminated ω—$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy)dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, or a mixture thereof.

72. The contact lens precursor of any one of embodiments 1 to 22 and 67 to 71 or the method of any one of embodiments 23 to 71, wherein said at least one silicone-containing polymerizable component comprises at least one silicone-containing vinylic crosslinker.
73. The contact lens precursor or the method of embodiment 71, wherein said at least one silicone-containing vinylic crosslinker is a polysiloxane vinylic crosslinker, a polycarbosiloxane vinylic crosslinker, or a combination thereof.
74. The contact lens precursor or the method of embodiment 71, wherein said at least one silicone-containing vinylic crosslinker is a di-(meth)acryloyl-terminated polydimethylsiloxane, a di-vinyl carbonate-terminated polydimethylsiloxane; a di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane, or a combination thereof.
75. The contact lens precursor or the method of embodiment 71, wherein said at least one silicone-containing vinylic crosslinker is a vinylic crosslinker of formula (I)

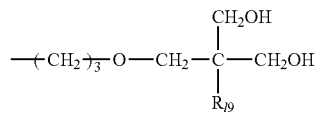

(Ic)

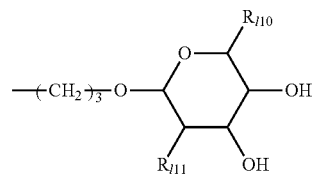

(Id)

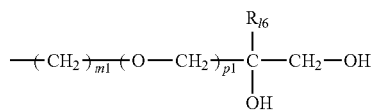

(Ie)

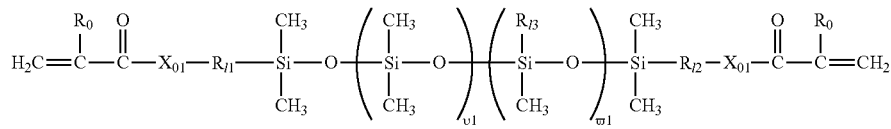

(I)

in which:
- $\upsilon 1$ is an integer of from 30 to 500 and $\omega 1$ is an integer of from 1 to 75, provided that $\omega 1/\upsilon 1$ is from about 0.035 to about 0.15 (preferably from about 0.040 to about 0.12, even more preferably from about 0.045 to about 0.10);
- $X_{01}$ is O or $NR_N$ in which $R_N$ is hydrogen or $C_1$-$C_{10}$-alkyl;
- $R_o$ is hydrogen or methyl;
- $R_{I1}$ and $R_{I2}$ independently of each other are a substituted or unsubstituted $C_1$-$C_{10}$ alkylene divalent radical or a divalent radical of $R_{I4}$—O—$R_{I5}$ in which $R_{I4}$ and $R_{I5}$ independently of each other are a substituted or unsubstituted $C_1$-$C_{10}$ alkylene divalent radical;
- $R_{I3}$ is a monovalent radical of any one of formula (Ia) to (Ie)

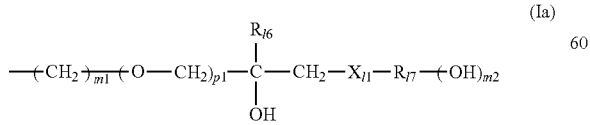

(Ia)

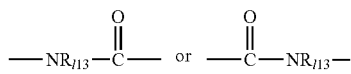

(Ib)

- p1 is zero or 1; m1 is an integer of 2 to 4; m2 is an integer of 1 to 5; m3 is an integer of 3 to 6; m4 is an integer of 2 to 5;
- $R_{I6}$ is hydrogen or methyl;
- $R_{I7}$ is a $C_2$-$C_6$ hydrocarbon radical having (m2+1) valencies;
- $R_{I8}$ is a $C_2$-$C_6$ hydrocarbon radical having (m4+1) valencies;
- $R_{I9}$ is ethyl or hydroxymethyl;
- $R_{I10}$ is methyl or hydromethyl;
- $R_{I11}$ is hydroxyl or methoxy;
- $X_{I1}$ is a sulfur linkage of —S— or a teriary amino linkage of —$NR_{I12}$— in which $R_{I12}$ is $C_1$-$C_1$ alkyl, hydroxyethyl, hydroxypropyl, or 2,3-dihydroxypropyl; and
- $X_{I2}$ is an amide linkage of $$-NR_{I13}-\overset{O}{\underset{\|}{C}}- \quad \text{or} \quad -\overset{O}{\underset{\|}{C}}-NR_{I13}-$$

in which $R_{I13}$ is hydrogen or $C_1$-$C_{10}$ alkyl.
76. The contact lens precursor or the method of embodiment 71, wherein said at least one silicone-containing vinylic crosslinker is a vinylic crosslinker of any one of formula (1) to (7).

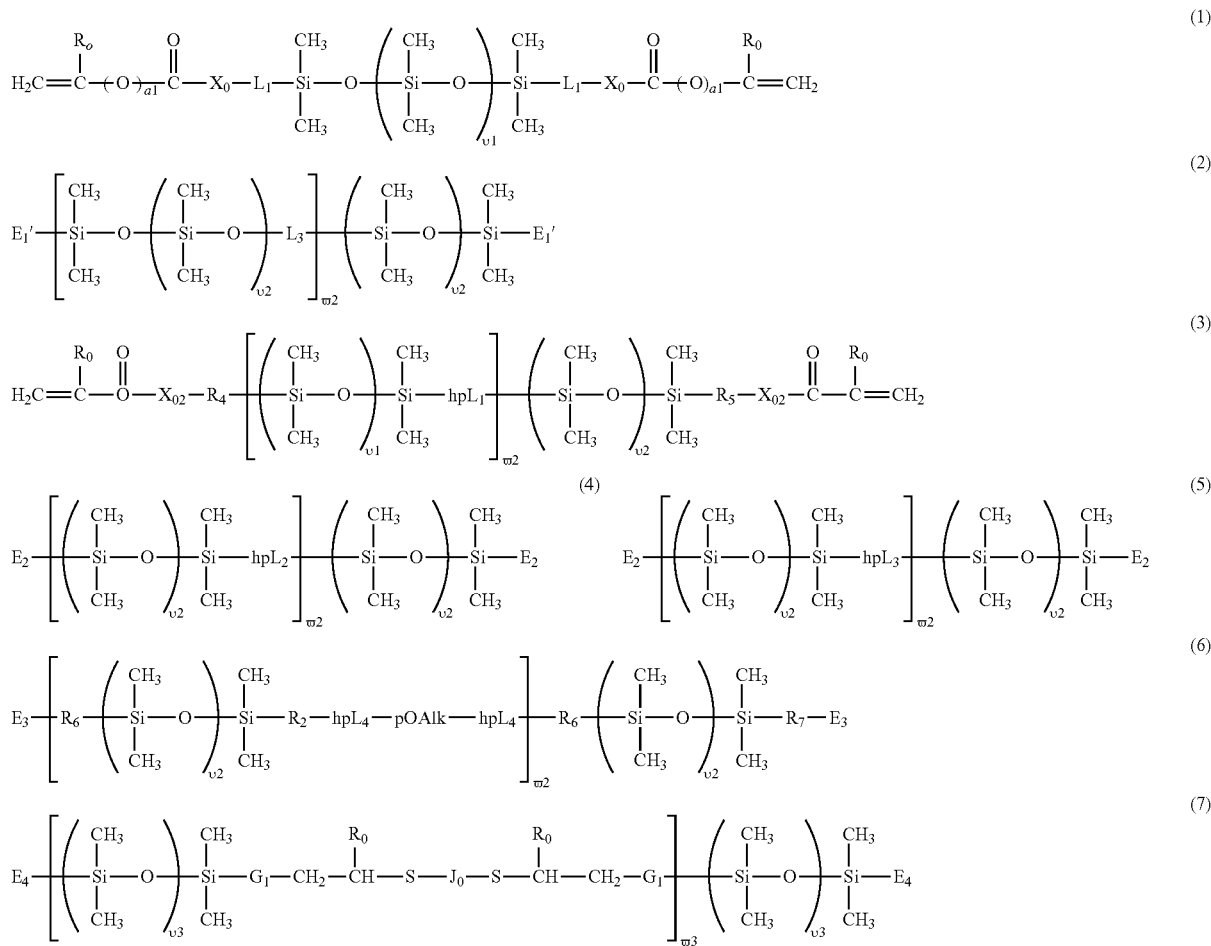

in which:
- υ1 is an integer of from 30 to 500;
- υ2 is an integer of from 5 to 50;
- υ3 is an integer of from 5 to 100;
- $\int 2$ and ω3 independent of each other are an integer of from 1 to 15;
- a1 and g1 independent of each other is zero or 1;
- h1 is an integer of 1 to 20 and h2 is an integer of 0 to 20;
- m1 and m3 independent of each other is 0 or 1, m2 is an integer of 1 to 6, m4 is an integer of 1 to 5, m5 is 2 or 3;
- q1 is an integer of 1 to 20, q2 is an integer of 0 to 20, q3 is an integer of 0 to 2, q4 is an integer of 2 to 50, q5 and q6 independent of each other are a number of 0 to 35, provided that (q4+q5+q6) is an integer of 2 to 50;
- x+y is an integer of from 10 to 30;
- e1 is an integer of 5 to 100, p1 and b1 independent of each other are an integer of 0 to 50, provided that (e1+p1+b1)≥10 and e1/(p1+b1)≥2 (preferably from about 2:1 to about 10:1, more preferably from about 3:1 to about 6:1) when (p1+b1)≥1;
- $R_o$ is H or methyl;
- $R_1$, $R_{1n}$, $R_{2n}$, $R_{3n}$, and $R_{4n}$ independent of one another are H or a $C_1$-$C_4$ alkyl having 0 to 2 hydroxyl group;
- $R_{n5}$ is H or a $C_1$-$C_{10}$ alkyl;
- $R_2$ is a $C_4$-$C_{14}$ hydrocarbon divalent radical;
- $R_3$ is a $C_2$-$C_6$ alkylene divalent radical;
- $R_4$ and $R_5$ independent of each other are a $C_1$-$C_6$ alkylene divalent radical or a $C_1$-$C_6$ alkylene-oxy-$C_1$-$C_6$ alkylene divalent radical;
- $R_6$ and $R_7$ independent of each other are a $C_1$-$C_6$ alkylene divalent radical or a $C_1$-$C_6$ alkoxy-$C_1$-$C_6$ alkylene divalent radical;
- $R_8$ and $R_9$ independent of each other are a substituted or unsubstituted $C_1$-$C_{12}$ alkylene divalent radical;
- $X_o$, $X_1'$, $X_{o1}$, $X_{o2}$, and $X_{o3}$ independent of one another are O or $NR_1$;
- $X_1$ is O, $NR_1$, NHCOO, OCONH, $CONR_1$, or $NR_1CO$;
- $X_{o4}$ is —COO— or —$CONR_{n5}$—;
- $X_{o5}$ and $X_{o7}$ independent of each other are a direct bond, —COO— or —$CONR_{n5}$—;
- $X_{o6}$ is a direct bond, a $C_1$-$C_6$ alkylene divalent radical, a $C_1$-$C_6$ alkylenoxy divalent radical, —COO—, or —$CONR_{n5}$—;
- $X_{o8}$ is a direct bond or —COO—;
- $X_{o9}$ is O or $NR_{n5}$;
- $X_{10}$ is a direct bond, a $C_1$-$C_6$ alkylene divalent radical, —COO—, or —$CONR_{n5}$—;

$E_1'$ is a monovalent radical of

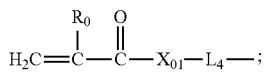

$E_2$ is a monovalent radical of

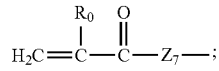

$E_3$ is a monovalent radical of

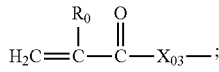

$E_4$ is a monovalent radical of

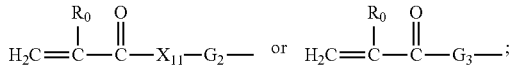

$L_1$ is a $C_2$-$C_8$ alkylene divalent radical or a divalent radical of -$L_1'$-$X_1L_1''$-, -(-$C_2H_4O$-)$_{q1}L_1''$-, -(-$C_2H_4O$-)$_{q1}$CONH-$L_1''$-, -$L_1'$-NHCOO-(-$C_2H_4O$-)$_{q1}L_1''$-, —CH$_2$—CH(OH)—CH$_2$—$X_1'$—(-$C_2H_4O$-)$_{q2}L_1''$-, -$L_1'$-$X_1'$—CH$_2$—CH(OH)—CH$_2$—O-$L_1''$-, or -(-$C_2H_4O$-)$_{q1}$CH$_2$—CH(OH)—CH$_2$—O-$L_1''$-;

$L_1'$ is a $C_2$-$C_8$ alkylene divalent radical which has zero or one hydroxyl group;

$L_1''$ is $C_3$-$C_8$ alkylene divalent radical which has zero or one hydroxyl group;

$L_3$ is a divalent radical of -$L_3'$-O-(-$C_2H_4O$-)$_{q2}$CONH—$R_2$-(-NHCO—PE-CONH—$R_2$-)$_{g1}$NHCO—(-OC$_2H_4$-)O-$L_3'$- in which PE is a divalent radical of -(-CH$_2$CH$_2$O-)$_{q3}Z_0$—CF$_2$-(-OCF$_2$-)$_x$-(-OCF$_2$CF$_2$-)$_y$OCF$_2$—$Z_0$-(-OCH$_2$CH$_2$-)$_{q3}$ or

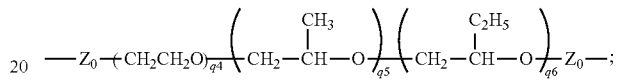

$L_3'$ is $C_3$-$C_8$ alkylene divalent radical;

$L_4$ is a divalent radical of —C$_2$H$_4$—NHCO—O—(-C$_2$H$_4$O-)$_{q2}L_3'$-, -(-C$_2$H$_4$O-)$_{q1}$CONH—$R_2$—NHCO—O-(-C$_2$H$_4$O-)$_{q2}L_3'$-, —$R_3$—O—CONH—$R_2$—NHCO—O-(-C$_2$H$_4$O-)$_{q2}L_3'$-, —CH$_2$—CH(OH)—CH$_2$—O-(-C$_2$H$_4$O-)$_{q2}L_3'$, or -(-C$_2$H$_4$O-)$_{q2}L_3'$-;

$hpL_1$ is a divalent radical of

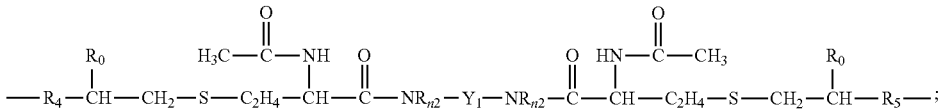

$hpL_2$ is a divalent radical of

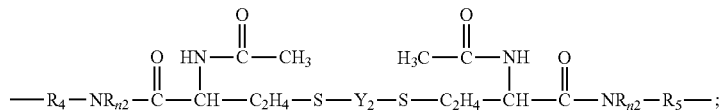

$hpL_3$ is a divalent radical of

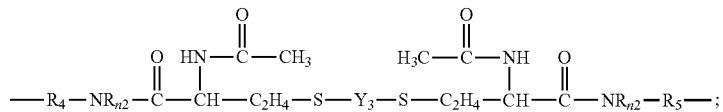

hpL$_4$ is a divalent radical of

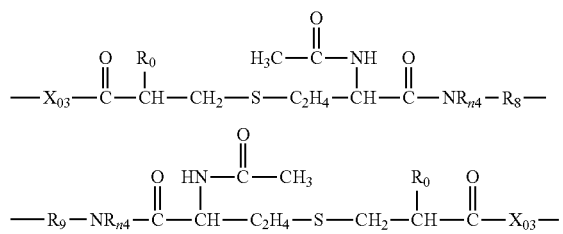

or

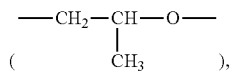

pOAlk is a divalent radical of -(EO)$_{e1}$(PO)$_{p1}$(BO)$_{b1}$— in which EO is an oxyethylene unit (—CH$_2$CH$_2$O—), PO is an oxypropylene unit

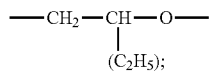

and BO is an oxybutylene unit $$-CH_2-\underset{(C_2H_5)}{CH}-O-;$$

M$_0$ is C$_3$-C$_8$ alkylene divalent radical;

M$_1$ is a C$_4$-C$_{14}$ hydrocarbon divalent radical;

M$_2$ and M$_3$ independent of each other are a C$_1$-C$_6$ alkylene divalent radical;

J$_0$ is a C$_1$-C$_{12}$ hydrocarbon radical having 0 to 2 hydroxyl or carboxyl groups;

G1 is a direct bond, a C$_1$-C$_4$ alkylene divalent radical, or a bivalent radical of —X$_{04}$—(C$_2$H$_4$O—)$_{h1}$CONH-M$_1$-NHCO—O—(C$_2$H$_4$O—)$_{h2}$M$_0$-, —X$_{05}$-M$_2$-O—CONH-M$_1$-NHCO—O—(C$_2$H$_4$O—)$_{h2}$M$_0$-, X$_{06}$—CH$_2$—CH(OH)—CH$_2$—O—(C$_2$H$_4$O—)$_{h2}$M$_0$-, —X$_{07}$—(C$_2$H$_4$O—)$_{h2}$M$_0$-; —X$_{08}$-M$_3$-NHCOO—(C$_2$H$_4$O—)$_{h1}$M$_0$-, —X$_{10}$—CH$_2$—CH(OH)—CH$_2$—X$_{09}$—(C$_2$H$_4$O—)$_{h2}$M$_0$-, —X$_{07}$-M$_3$-X$_{09}$—CH$_2$—CH(OH)—CH$_2$—O-M$_0$-, or —X$_{08}$—(C$_2$H$_4$O—)$_{h1}$CH$_2$—CH(OH)—CH$_2$—O-M$_0$- in which M$_o$ is linked to Si atom while X$_{04}$ to X$_{10}$ are linked to the group of —CH$_2$— in formula (7) and at least one of J$_0$ and G1 in formula (7) comprises at least one moieties selected from the group consisting of hydroxyl groups, urethane linkage of —OCONH—, amino groups of —NHR$^o$—, amino linkages of —NH—, amide linkages of —CONH—, carboxyl groups, and combinations thereof;

G$_2$ is a C$_1$-C$_4$ alkylene divalent radical or a bivalent radical of —(C$_2$H$_4$O—)$_{h1}$CONH-M$_1$-NHCO—(C$_2$H$_4$O—)$_{h2}$M$_0$-, -M$_1$-O—CONH-M$_1$-NHCO—(C$_2$H$_4$O—)$_{h2}$M$_0$-, —CH$_2$—CH(OH)—CH$_2$—O—(C$_2$H$_4$O—)$_{h2}$M$_0$-, —(C$_2$H$_4$O—)$_2$M$_0$-, -M$_3$-NHCOO—(C$_2$H$_4$O—)$_{h1}$M$_0$-, —CH$_2$—CH(OH)—CH$_2$—X$_{09}$—(C$_2$H$_4$O—)$_{h2}$M$_0$-; -M$_3$-NHCOO—(C$_2$H$_4$O—)$_{h1}$M$_0$-, —CH$_2$—CH(OH)—CH$_2$—X$_{09}$—(C$_2$H$_4$O—)$_{h2}$M$_0$-, -M$_3$-X$_{09}$—CH$_2$—CH(OH)—CH$_2$—O-M$_0$-, or —(C$_2$H$_4$O—)$_{h1}$CH$_2$—CH(OH)—CH$_2$—O-M$_0$-;

G$_3$ is a divalent radical of

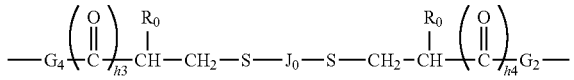

in which h3 and h4 independent of each other are 1 or 0;

G4 is a divalent radical of any one of (a) —NR$_3$'— in which R$_3$' is hydrogen or C$_1$-C$_3$ alkyl, (b)

(c) —NR$_0$-G$_5$-NR$_0$— in which G$_5$ is a C$_1$-C$_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, and (d) —O-G$_6$-O— in which G$_6$ is a C$_1$-C$_6$ alkylene divalent radical, a divalent radical of

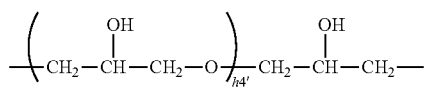

in which h4' is 1 or 2, a divalent radical of

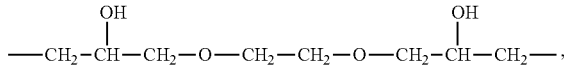

a divalent radical of —(CH$_2$—CH$_2$—)—$_{h5}$CH$_2$—CH$_2$— in which h5 is an integer of 1 to 5, a divalent radical of

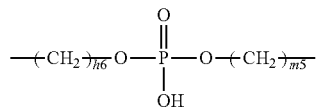

in which h6 is 2 or 3, or a substituted C$_3$-C$_8$ alkylene divalent radical having a hydroxyl group or phosphonyloxy group;

Y$_1$ is a C$_1$-C$_6$ alkylene divalent radical, 2-hydroxylpropylene divalent radical, 2-(phosphonyloxy)propylene divalent radical, 1,2-dihydroxyethylene divalent radical, a divalent radical of

or a divalent radical of

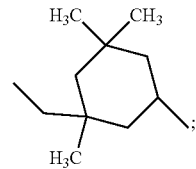

$Y_2$ is a divalent radical of

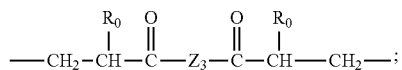

$Y_3$ is a divalent radical of

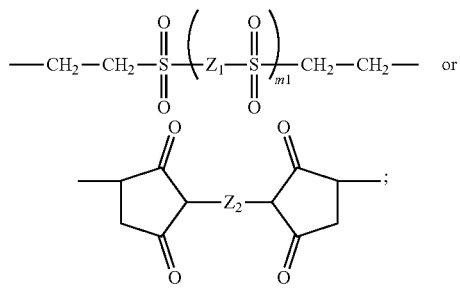

$Z_0$ is a direct bond or a $C_1$-$C_{12}$ alkylene divalent radical;
$Z_1$ is a $C_1$-$C_6$ alkylene divalent radical, a hydroxyl- or methoxy-substituted $C_1$-$C_6$ alkylene divalent radical, or a substituted or unsubstituted phenylene divalent radical,
$Z_2$ is a $C_1$-$C_6$ alkylene divalent radical, a hydroxyl- or methoxy-substituted $C_1$-$C_6$ alkylene divalent radical, a dihydroxyl- or dimethoxy-substituted $C_2$-$C_6$ alkylene divalent radical, a divalent radical of $C_2H_4$—(O—$C_2H_4)_{m2}$, a divalent radical of —$Z_4$—S—S—$Z_4$—, a hydroxyl- or methoxy-substituted $C_1$-$C_6$ alkylene divalent radical, or a substituted or unsubstituted phenylene divalent radical,
$Z_3$ is a divalent radical of any one of (a) —$NR_{n3}$—, (b)

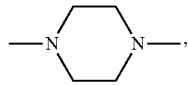

(c) —$NR_0$—$Z_5$—$NR_0$—, and (d) —O—$Z_6$—O—,
$Z_4$ is a $C_1$-$C_6$ alkylene divalent radical,
$Z_5$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical,
$Z_6$ is (a) a $C_1$-$C_6$ alkylene divalent radical, (b) a divalent radical of

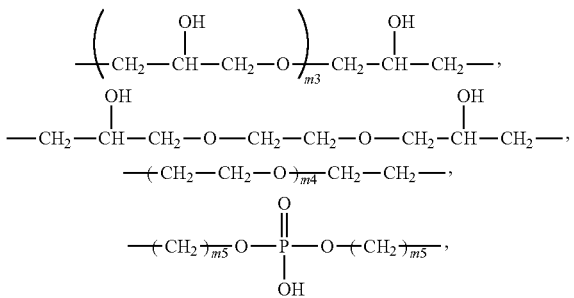

or (c) a substituted $C_3$-$C_8$ alkylene divalent radical having a hydroxyl group or phosphonyloxy group, $Z_7$ is a divalent radical of

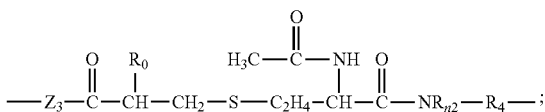

and
$Z_8$ is a divalent radical of

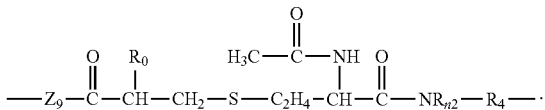

77. The contact lens precursor or the method of embodiment 71, wherein said at least one silicone-containing vinylic crosslinker is α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, or a combination thereof.

78. The contact lens precursor of any one of embodiments 1 to 22 and 67 to 77 or the method of any one of embodiments 23 to 78, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth) acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth) acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth) acrylate, tri(ethylene glycol) (meth)acrylate, tetra(ethylene glycol) (meth)acrylate, poly(ethylene glycol) (meth) acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth) acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth) acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) acrylic monomers having a $C_1$-$C_4$ alkoxyethoxy group selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly (ethylene glycol) (meth)acrylate having a weight average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth) acryloyloxyethyl phosphorylcholine, (meth)acryloyloxypropyl phosphorylcholine, 4-((meth)acryloyloxy)butyl-2'-(trimethylammonio)ethylphosphate, 2-[(meth) acryloylamino]ethyl-2'-(trimethylammonio)-ethylphosphate, 3-[(meth)acryloylamino]propyl-2'-(trimethylammonio)ethylphosphate, 4-[(meth) acryloylamino]butyl-2'-(trimethylammonio) ethylphosphate, 5-((meth)acryloyloxy)pentyl-2'-(trimethylammonio)ethyl phosphate, 6-((meth) acryloyloxy)hexyl-2'-(trimethylammonio)-ethylphosphate, 2-meth)acryloyloxy)ethyl-2'-(triethylammonio)ethylphosphate, 2-((meth)acryloyloxy) ethyl-2'-(tripropylammonio)ethylphosphate, 2-((meth) acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth) acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio) ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12) N-2-hydroxyethyl vinyl carbamate; (13) N-carboxyvinyl-β-alanine (VINAL); (14) N-carboxyvinyl-α-alanine; (15) or combinations thereof.

79. The contact lens precursor or the method of embodiment 78, wherein said at least one hydrophilic vinylic monomer comprises N-vinylpyrrolidone, N-vinyl-N-methyl acetamide, or combinations thereof.

80. The contact lens precursor or the method of embodiment 78 or 79, wherein said at least one hydrophilic vinylic monomer comprises N,N-dimethyl (meth)acrylamide.
81. The contact lens precursor or the method of any one of embodiments 78 to 80, wherein said at least one hydrophilic vinylic monomer comprises N-2-hydroxyethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth) acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth) acrylate, tri(ethylene glycol) (meth)acrylate, tetra(ethylene glycol) (meth)acrylate, poly(ethylene glycol) (meth) acrylate having a number average molecular weight of up to 1500, poly(ethylene glycol)ethyl (meth)acrylamide having a number average molecular weight of up to 1500, or combinations thereof.
82. The contact lens precursor of any one of embodiments 1 to 22 and 67 to 81 or the method of any one of embodiments 23 to 82, wherein said at least one N-Boc-containing vinylic monomer comprises N-[2-(N-tert-butoxycarbonylamino)ethyl] (meth)acrylamide, N-[3-(N-tert-butoxycarbonylamino)propyl] (meth)acrylamide, 2-(N-tert-butoxycarbonylamino)ethyl (meth)acrylate, 3-(N-tert-butoxycarbonylamino)propyl (meth)acrylate, 3-(N-tert-butoxycarbonylamino)-2-hydroxypropyl (meth) acrylate, Boc-protected vinylamine, Boc-protected allylamine, or combinations thereof.
83. The contact lens precursor of any one of embodiments 1 to 22 and 67 to 82 or the method of any one of embodiments 23 to 83, wherein said at least one non-silicone vinylic cross-linking agents comprises ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth) acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl] tetrahydrofuan, diacrylamide, dimethacrylamide, N,N-di (meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth) acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allylmethacrylamide, N-allyl-acrylamide, or combinations thereof.
84. The contact lens precursor of any one of embodiments 1 to 22 and 67 to 83 or the method of any one of embodiments 23 to 84, wherein said at least one blending vinylic monomer comprises methyl methacrylate.
85. The contact lens precursor of any one of embodiments 1 to 22 and 67 to 84 or the method of any one of embodiments 23 to 85, wherein the polymerizable composition comprises 2-[2'-hydroxy-5'-(2-methacryloxyethyl)phenyl)]-2H-benzotriazole and a UV/HEVL absorbing vinylic monomer selected from the group consisting of 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole, 2-{2'-Hydroxy-3'-tert-butyl-5'-[3'-methacryloyloxypropoxy]phenyl}-5-chloro-2H-benzotriazole, 2-[2'-Hydroxy-3'-tert-butyl-5'-(3'-acryloyloxypropoxy)phenyl]-5-trifluoromethyl-2H-benzotriazole, and combinations thereof.
86. A silicone hydrogel contact lens obtained according to the method of any one of embodiments 23 to 85.
87. The silicone hydrogel contact lens of embodiment 86, wherein the silicone hydrogel contact lens has an oxygen permeability of at least 50 barrers, an elastic modulus of from about 0.2 MPa to about 1.5 MPa, and an equilibrium water content of from about 40% to about 70%.
88. The silicone hydrogel contact lens of embodiment 86 or 87, wherein the silicone hydrogel contact lens has a water-break-up-time of at least 10 seconds.
89. The silicone hydrogel contact lens of any one embodiments 86 to 88, wherein the silicone hydrogel contact lens has a water contact angle by static sessile drop of about 90 degrees or less.
90. The silicone hydrogel contact lens of any one embodiments 86 to 88, wherein the silicone hydrogel contact lens has a friction rating of about 2 or less.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the apparent oxygen permeability ($Dk_{app}$), the apparent oxygen transmissibility (Dk/t), the intrinsic (or edge-corrected) oxygen permeability ($Dk_i$ or $Dk_c$) of a lens and a lens material are determined according to procedures described in Example 1 of U.S. pat. Appl. Pub. No. 2012/0026457 A1.

Surface Wettability Tests

Water contact angle (WCA) on a contact lens is a general measure of the surface wettability of a contact lens. In particular, a low water contact angle corresponds to more wettable surface.

The dynamic captive bubble contact angles of contact lenses are measured using a FDS instrument device from FDS Future Digital Scientific Corp. The FDS equipment is capable of measuring the advancing and receding contact angles. The measurement is performed on hydrated contact lenses at room temperature. A contact lens is removed from the vial and soaked in ~40 mL fresh phosphate buffered saline (PBS) and shake for at least 30 minutes, then replace with fresh PBS, soak and shake for another 30 minutes unless otherwise specified. The contact lens is then put on a lens paper and dabbed to remove surface water prior to be placed on top of a lens holder with front curve up then screw the lens holder top on. Place the secure lens holder into the glass cell cuvette filled with filtered PBS. Place the glass cell cuvette onto the stage of the FDS instrument. Adjust the stage height and the syringe needle to dispense the air bubble to the lens surface. Repeat dispense/withdraw 3 cycles for every lens to get the advancing and receding contact angles. The receding contact angles are reported in the examples below.

Average contact angles (Sessile Drop) of contact lenses are measured using a VCA 2500 XE contact angle measurement device from AST, Inc., located in Boston, Mass. This equipment is capable of measuring advancing or receding contact angles or sessile (static) contact angles. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wipe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity >18MΩcm and the droplet volume used is 2 μl. The tweezers and the pedestal are washed well with Isopropanol and rinsed with DI water before coming in contact with the contact lenses.

Water Break-Up Time (WBUT) Tests

The surface hydrophilicity of lenses (after autoclave) is assessed by determining the time required for the water film to start breaking on the lens surface. Lenses exhibiting WBUT≥10 seconds are considered to have a hydrophilic surface and are expected to exhibit adequate wettability (ability to support the tear film) on-eye.

Lenses are prepared for water breakup measurement by removing the lens from its blister with soft plastic tweezers (e.g., those from Menicon) and placing the lens in a test tube containing phosphate buffered saline. The test tube contains 10 mL phosphate buffered saline per lens, 1 lens per test tube. Lenses are soaked overnight (at least 16 hours) before testing.

WBUT is measured at room temperature as follows: the lens is removed from the test tube and placed on a pedestal submerged in PBS. The pedestal is then raised out of the PBS solution (t=0), and a video camera monitors the fluid flowing off the lens surface. When the lens surface fluid breaks, this WBUT time is recorded. Optionally, a stop watch can be used to measure the time between when the pedestal is raised out of the PBS and when the lens surface fluid breaks. The pedestal is withdrawn, pulling the lens beneath the surface of the PBS. At least 3 spots per lenses are measured, and at least 3 lenses are measured to obtain an average WBUT measurement for each lens group.

Lubricity Evaluation.

The lubricity of a contact lens is evaluated by using a finger-felt lubricity test which characterizes qualitatively the slipperiness of a lens surface on a friction rating scale of from 0 to 4. The higher the friction rating is, the lower the slipperiness (or lubricity).

Commercial lenses: DAILIES® TOTAL1®; ACUVUE® OASYS™; ACUVUE® ADVANCE PLUS™; DAILIES® Aqua Comfort Plus®; and AIR OPTIX®, are assigned a friction rating (designated "FR" hereinafter) of 0, 1, 2, 3, and 4 respectively. They are used as standard lenses for determining the friction rating of a lens under test.

The samples are placed in PBS for at least two rinses of 30 minutes each and then transferred to fresh PBS before the evaluation. Before the evaluation, hands are rinsed with a soap solution, extensively rinsed with DI water and then dried with KimWpe® towels. The samples are handled between the fingers and a numerical number is assigned for each sample relative to the above standard lenses described above. For example, if lenses are determined to be only slightly better than AIR OPTIX® lenses, then they are assigned a number 3. The value of a friction rating is one obtained by averaging the results of at least two friction ratings of a contact lens by two or more persons and/or by averaging the friction ratings of two or more contact lenses (from the identical batch of lens production) by one person.

The finger lubricities (i.e., friction ratings) of a contact lens can be determined either directly out-of-pack (OOP) but after ≥30 min soaking in PBS) or after i cycles (e.g., 7, 14, 21, or 30 cycles) of digital rubbing treatment, or after simulated abrasion cycling treatment according to the procedures described above.

Equilibrium Water Content

The equilibrium water content (EWC) of contact lenses is determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Fluorescent Visualization of Phosphocholine Coatings with CRP

To visualize the phosphocholine-rich surface coating, C-reactive protein (CRP) is used to bind specifically towards phosphorylcholine (PCh) surface groups. The CRP is covalently tagged with a fluorescent dye Alexa-488 enabling PCh visualization with a fluorescent microscope. Alexa-488 is reacted with the CRP (3.5 mg/mL) at a 10 to 1 ratio in 10 mM Tris-HCl buffer, and then purified by a size exclusion spin column (i.e. Nanosep MF). The lenses are incubated in the fluorescent CRP solution (10 ng/mL-100 ng/mL) for 2 hours to allow for maximum binding. Fluorescence microscopy (e.g., a Leika SP8) is then used to visualize the uniformity. The thickness of the MPC surface can be measured with the microscopy software, after following the standard calibration process or using a micrometer.

Chemicals

The following abbreviations are used in the following examples: APMAAm represents N-(3-aminopropyl) methacrylamide; APMAAm-HCl represents N-(3-aminopropyl) methacrylamide hydrochloride; Boc-APMAAm represents N-[3-(N-tert-butoxycarbonylamino)propyl] methacrylamide; NVP represents N-vinylpyrrolidone; DMA represents N,N-dimethylacrylamide; MMA represents methyl methacrylate; TEGDMA represent triethyleneglycol dimethacrylate; VAZO 64 represents 2,2'-dimethyl-2,2'azodipropiono-nitrile; Nobloc is 2-[3-(2H-Benzotriazol-2-yl)-4-hydroxyphenyl]ethyl methacrylate from Aldrich; TAA represents tert-amyl alcohol; PrOH represents 1-propanol; IPA represents isopropanol; DC 1173 represents Darocur 1173® photoinitiator; PAA represents polyacrylic acid; PMAA represents polymethacrylic acid; PAE represents polyamidoamine-epichlorohydrin (a.k.a., polyamine-epichlorohydrin); MPC represent 2-methacryloyloxyethyl phosphorylcholine; Poly(AAm-co-AA) represents poly(acrylamide-co-acrylic acid); PBS represents a phosphate-buffered saline which has a pH of 7.2±0.2 at 25° C. and contains about 0.044 wt. % $NaH_2PO_4.H_2O$, about 0.388 wt. % $Na_2HPO_4.2H_2O$, and about 0.79 wt. % NaCl and; wt. % represents weight percent; D9 represents monobutyl-terminated monomethacryloxypropyl-terminated polydimethylsiloxane (Mw~984 g/mol from Shin-Etsu); CEPDMS represents a di-methacrylate-terminated chain-extended polydimethylsiloxane (Mn~9000 g/mol), which has three polydimethylsiloxane (PDMS) segments linked via diurethane linkages between two PDMS segments and two urethane linkages each located between one terminal methacrylate group and one PDMS segment, is prepared according to method similar to what described in Example 2 of U.S. Pat. No. 8,529,057; "G4" macromer represents a di-methacryloyloxypropyl-terminated polysiloxane (Mn~13.5K g/mol, OH content ~1.8 meq/g) of formula (A).

However, the pH of an aqueous solution of Boc-APMAAm (in deionized water, i.e., in DI water) is not adjusted or increased to pH~9 at room temperature or about 100° C., no t-butyl alcohol is detected by GC in the Boc-APMAAm aqueous solution, indicating no deprotection of amine at a neutral or higher pH even at a high temperature.

Similarly, when the pH of a solution of Boc-APMAAm in methanol (or in IPA) is adjusted to pH~2.0 at room temperature by adding HCl, t-butyl alcohol is detected by GC in the acidified Boc-APMAAm aqueous solution, indicating the deprotection of amine even at room temperature.

When the pH of a solution of Boc-APMAAm in TAA is not adjusted at about 100° C., no t-butyl alcohol is detected by GC in the Boc-APMAAm aqueous solution, indicating no deprotection of amine at a neutral pH even at a high temperature.

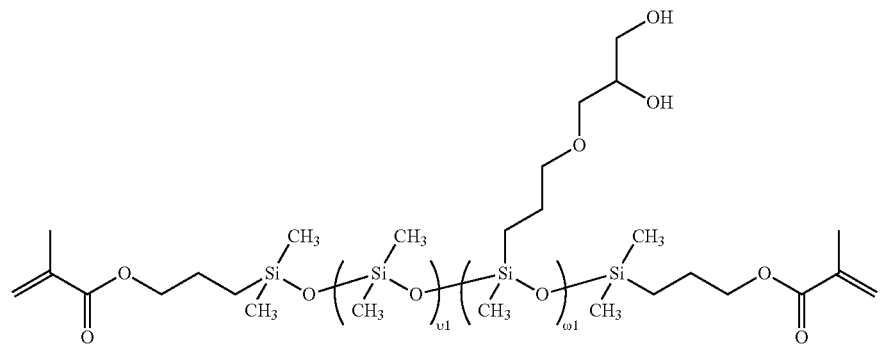

(A)

Example 2

Gas chromatography (GC) is used in determining the conditions under which the amino-protecting group tBoc can be removed.

When the pH of an aqueous solution of Boc-APMAAm (in deionized water, i.e., in DI water) is adjusted to pH~2.0 at room temperature or about 100° C. by adding HCl, t-butyl alcohol is detected by GC in the acidified Boc-APMAAm aqueous solution, indicating the deprotection of amine even at room temperature according to the following reaction scheme.

Example 3

Studies are carried out to determine whether amino-containing vinylic monomer hydrochloride and Boc-protected amino-containing vinylic monomer are compatible with the hydrophobic and hydrophilic components of a SiHy lens formulation.

A base SiHy lens formulation is prepared to have the following composition: 33 unit parts of D9; 10 unit parts of G4; 46 unit parts of NVP; 10 unit parts of MMA; 0.65 unit part of TEGDMA; 1.5 unit parts of Nobloc; 0.5 unit part of Vazo64; and 10 unit parts of TAA. The obtained basis SiHy lens formulation is clear.

When 2 or 4 unit parts of Boc-APMAAm is added into the basis SiHy lens formulation and mixed thoroughly, the resultant lens formulation is still clear. However, when either 2 or 4 unit parts of APMAAm-HCl is added into the basis SiHy lens formulation and mixed thoroughly, the resultant lens formulation immediately becomes cloudy and precipitation is observed 30 minutes after mixing.

Example 4

APMAAm Preparation

APMAA-HCl is treated with NaOH (aq) pH 10 and subsequently extracted using chloroform. The organic fraction is washed with saturated NaCl (aq) and then dried over $MgSO_4$. Solvent is removed by reduced pressure rotary evaporation to yield a yellow viscous clear liquid.

Preparation of Poly(MPC-co-AEM) (96/4 wt/wt)

A copolymer, poly(2-methacryloyloxyethyl phosphorylcholine-co-2-Aminoethylmethacrylate)(96/4 w/w) (i.e., poly(MPC-co-AEM), is prepared by thermal polymerizing a polymerizable composition comprising: about 96 wt % MPC; about 4 wt % AEM; about 0.02 wt % Vazo 56 [2,2'-Azobis(2-methylpropionamidine) dihydrochloride]; about 0.1 wt % chain transfer agent (HS—CH2CH2OH) in water at about 60° C. for about 2 hours and then at 20° C. for about 2 hours. The obtained poly(MPC-co-AEM) (an aqueous solution with solid content ~10%) is determined to have an amine functionality of ~0.22 meq/g, and a Mn of ~160 kDa.

The obtained copolymer is used as a hydrophilicity-enhancing agent for preparing a water soluble thermally-crosslinkable polymeric material (i.e., "in-package-crosslinking agent" or "IPC agent") in a reaction with polyamidoamine-epichlorohydrin (PAE). PAE solutions (Kymene) are purchased from Ashland as an aqueous solution and used as received.

Phosphate Buffered Saline (PBS)

A phosphate buffered saline is prepared by dissolving $NaH_2PO_4 \cdot H_2O$, $Na_2HPO_4 \cdot 2H_2O$, and in a given volume of purified water (distilled or deionized) to have the following composition: ca. 0.044 w/w % $NaH_2PO_4 \cdot H_2O$, ca. 0.388 w/w/% $Na_2HPO_4 \cdot 2H_2O$, and ca. 0.79 w/w % NaCl.

IPC Saline

The IPC saline is prepared as follows. Mix 77 w/w % poly(MPC-co-AEM) aqueous solution prepared above, 6.1 w/w % PAE, and 16.9 w/w % of a phosphate buffer (about 128 mM of phosphate sodium salts and about 4 wt % NaCl) (the concentration of poly(MPC-co-AEM) and PAE are about 10 times of the final saline). Adjust pH to ~7.3 by 1N NaOH. React the mixture in a water bath at temperature=70° C. for 3 hours. Remove the mixture from water bath and cool down in a room temperature water bath. Dilute the mixture 10 times with a phosphate buffer (~33 mM of phosphate sodium salts and 0.77 wt % NaCl) and adjust pH to ~7.3. Filter the mixture by 0.22 μm PES sterile filter unit.

Preparation of SiHy Lens Formulations

Several lens formulations are prepared to have the compositions shown in Table 1

TABLE 1

| | Formulation Composition (Unit Parts) | | | | | |
|---|---|---|---|---|---|---|
| Component | 4-0 | 4-0.5Boc | 4-1.5Boc | 4-2Boc | 4-10Boc | 4-4amine |
| D9 | 33 | 33 | 33 | 33 | 33 | 33 |
| G4 | 10 | 10 | 10 | 10 | 10 | 10 |

TABLE 1-continued

| | Formulation Composition (Unit Parts) | | | | | |
|---|---|---|---|---|---|---|
| Component | 4-0 | 4-0.5Boc | 4-1.5Boc | 4-2Boc | 4-10Boc | 4-4amine |
| NVP | 46 | 46 | 46 | 46 | 46 | 46 |
| MMA | 10 | 10 | 10 | 10 | 10 | 10 |
| TEGDMA | 0.65 | 0.65 | 0.65 | 0.65 | 0.65 | 0.65 |
| Norbloc | 1.5 | 1.5 | 1.5 | 1.5 | 1.5 | 1.5 |
| Vazo64 | 0.5 | 0.5 | 0.5 | 0.5 | 0.5 | 0.5 |
| TAA | 10 | 10 | 10 | 10 | 10 | 10 |
| Boc-APMAAm | 0 | 0.5 | 1.5 | 2 | 10 | 0 |
| APMAAm | 0 | 0 | 0 | 0 | 0 | 4 |

Cast-Molding of SiHy Contact Lenses

One of the lens formulations prepared above is purged with nitrogen at room temperature for 30 to 35 minutes. The $N_2$-purged lens formulation is introduced into polypropylene molds (each having a water contact angle of about 105 degree by static sessile drop) and thermally cured in an oven under the following curing conditions: ramping from room temperature to a first temperature and then holding at the first temperature for a first curing time period; ramping from the first temperature to a second temperature and holding at the second temperature for a second curing time period; optionally ramping from the second temperature to a third temperature and holding at the third temperature for a third curing time period; and optionally ramping from the third temperature to a fourth temperature and holding at the fourth temperature for a fourth curing time period.

Polypropylene lens molds are opened by using a demolding machine with a push pin. Lenses are pushed onto base curve molds with a push pin and then molds are separated into base curve mold halves and front curve mold halves. The base curve mold halves with a lens thereon are placed in an ultrasonic device (e.g., Dukane's single horn ultrasonic device). With a certain energy force, a dry state lens is released from mold.

The dry state lenses (unextracted dry lenses) obtained above are tested by using XPS for determining the surface composition and the results are reported in Table 2.

TABLE 2

| | [Amine] | Atomic Composition by XPS (%) | | | | |
|---|---|---|---|---|---|---|
| Lens | (meq/100g*) | C | N | O | Si | N/Si |
| 4-0 | 0 | 58.5 | 2.20 | 24.54 | 14.76 | 0.149 |
| 4-4amine | 26.6 | 60.43 | 2.72 | 24.10 | 12.75 | 0.213 |
| 4-2Boc | 8.0 | 59.19 | 2.90 | 25.37 | 12.53 | 0.231 |
| 4-10Boc | 37.0 | 60.01 | 3.11 | 25.18 | 11.71 | 0.266 |

* miliequivalent of protected or free amino group per 100 grams of the total amount of all the polymerizable compoment in lens formulation.

It is found that lenses prepared from a lens formulation with Boc-APMAAm have more N enrichment at the surface than is observed with a lens prepared from a lens formulation having APMAA. This comparison is made with unextracted dry lenses to demonstrate that the protected amine is nitrogen enriched at the lens-mold interface, wherein a non-polar polypropylene mold is used. In this example, even a lower BOC content formulation has a higher N/Si ratio than that observe with the APMAA formulation at higher concentration.

Processing of Cast-Molded SiHy Contact Lenses

The dry state lenses obtained above are loaded in a designed extraction tray and subjected to a series of post-molding processing procedures at room temperature as shown in Table 3. The lenses after hydration in PBS are individually packaged in lens packages containing a phosphate buffered saline prepared above or an IPC saline prepared above as indicated in Table 4 and autoclaved at 121° C. for about 30 minutes.

TABLE 3

| Process path | Step | Medium | Time (min) | pH |
|---|---|---|---|---|
| A | 1 | 100% IPA | 60 | 2 |
|   | 2 | 50% IPA | 30 | neutral |
|   | 3 | DI water | 15 | neutral |
|   | 4 | DI water | 15 | neutral |
|   | 5 | PBS | >15 | Buffered 7-7.5 |
| B | 1 | 100% IPA | 60 | 2 |
|   | 2 | 50% IPA | 10 | 9 |
|   | 3 | DI water | 15 | neutral |
|   | 4 | DI water | 15 | neutral |
|   | 5 | PBS | >15 | Buffered 7-7.5 |

TABLE 4

| Formulation | [Amine] (meq/100 g*) | Packaging saline | Friction Rating | WCA (°) | Atomic % P (by XPS) |
|---|---|---|---|---|---|
| 4-0 | 0 | PBS | 2 | 90 | 0 |
| 4-0 | 0 | IPC | 2 | 90 | 0.06 |
| 4-0.5Boc | 2.0 | PBS | 1.7 | 86 | 0 |
| 4-0.5Boc | 2.0 | IPC | 1.5 | 68 | 0.11 |
| 4-1.5Boc | 6.0 | PBS | 2 | 90 | 0 |
| 4-1.5Boc | 6.0 | IPC | 1.6 | 75 | 0.41 |
| 4-2Boc | 8.0 | PBS | 1.7 | 82 | 0.06 |
| 4-2Boc | 8.0 | IPC | 1.5 | 53 | 0.45 |
| 4-4amine | 26.6 | PBS | 1.8 | 90 | 0 |
| 4-4amine | 26.6 | IPC | 1.6 | 90 | 0.01 |

*miliequivalent of protected or free amino group per 100 grams of the total amount of all the polymerizable compoment in lens formulation.

The obtained lenses are characterized by determining their water contact angle, lubricity (finger lubricity rating), and atomic percentage of P by XPS. As shown by Table 3, the lenses prepared from a lens formulation comprising the addition of Boc-APMAAm into a lens formulation can improve the lubricity and the wettability (i.e., water contact angle, WCA, by static sessile drop). However, the improvement in wettability for lenses made a lens formulation including APMAAm (free amine-methacrylamide) are not as pronounced, probably due to fewer amine groups present on lens surface. For the lenses made from a lens formulation comprising Boc-APMAAm and autoclaved in IPC, the element P detected by XPS can be attributed to a coating of poly(MPC-co-AEM) covalently attached to the lens.

The lenses, which is cast-molded from lens formulation 4-2Boc and autoclaved in IPC saline are examined for the presence of a phosphorylcholine coating on lens surface, according to the procedures of Fluorescent visualization of phosphocholine coatings with CRP described in Example 1. The examination of the fluorescent microscopic images reveals that the CRP-stained lenses (4-2Boc, autoclaved in IPC) has fluorescence observed on the lens, whereas the CRP-stained lenses (4-2Boc, autoclaved in PBS) has no fluorescence on the lens.

Example 5

The dry state lenses, which are prepared in Example 4 from lens formulation 4-10Boc, are loaded in a designed extraction tray and are extracted with methanol under various conditions shown in Table 5 while converting Boc-protected amino groups to primary amino groups during extraction process. The efficiency of deprotection under various conditions is determined by determining the deprotecting-product, tert-butanol (t-BuOH) present in the extraction medium (methanol) by gas chromatography. The results are reported in Table 5.

TABLE 5

| Samples | Conditions for de-protection | t-BuOH (ppm) | Lens appearance |
|---|---|---|---|
| No lens | pH 2, 40° C., 2 hours | N/D | N/A |
| TBOC10 lens | pH 2, 40° C., 2 hours | 1.193 | Yellowing |
| TBOC10 lens | pH 2, 40° C., 0.5 hours | 1.136 | Yellowing |
| TBOC10 lens | pH 2, 25° C., 0.5 hours | N/D | No color |
| TBOC10 lens | pH 2, 25° C., 2 hours | N/D | No color |
| TBOC10 lens | pH 4, 40° C., 2 hours | 1.153 | Yellowing |
| TBOC10 lens | pH 4, 40° C., 0.5 hours | 1.383 | Yellowing |
| TBOC10 lens | pH 4, 25° C., 2 hours | N/D | No color |
| TBOC10 lens | pH 4, 25° C., 0.5 hours | N/D | No color |
| TBOC10 lens | pH 3, 32.5° C., 0.5 hours | N/D | No color |
| TBOC10 lens | pH 3, 32.5° C., 1.25 hours | N/D | No color |

N/D: not detected.

It is found that when the extraction/deprotection with methanol as extraction medium is carried out at 40° C. and a pH of from 2.0 to 4.0, Boc-protected amino groups can be readily converted to primary amino groups during extraction process.

All the publications and patents which have been cited herein above are hereby incorporated by reference in their entireties.

What is claimed is:

1. A contact lens precursor, comprising a silicone hydrogel bulk material which comprises:
   (1) from about 20% to about 79% by weight of first repeating units of at least one silicone-containing polymerizable component, wherein said at least one silicone-containing polymerizable component comprises at least one silicone-containing vinylic monomer, at least one silicone-containing vinylic crosslinker, or a combination thereof;
   (2) from 20% to about 79% by weight of second repeating units of at least one hydrophilic vinylic monomer;
   (3) from about 1% to about 15% by weight of third repeating units of at least one N-Boc-containing vinylic monomer;
   (4) from 0 to about 2.5% by weight of fourth repeat units of at least one non-silicone vinylic crosslinker;
   (5) from 0 to about 25% by weight of fifth repeating units of at least one blending vinylic monomer; and
   (6) from about 0.1 to about 2.5% by weight of sixth repeating units of at least one UV-absorbing vinylic monomer which comprises 2-[2'-hydroxy-5'-(2-methacryloxyethyl)phenyl)]-2H-benzotriazole and at least one UV/HEVL-absorbing vinylic monomer selected from the group consisting of 2-{2'-Hydroxy-3'-tert-butyl-5'-[3'-methacryloyloxypropoxy]-phenyl}-2H-benzotriazole, 2-{2'-Hydroxy-3'-tert-butyl-5'-[3'-methacryloyloxypropoxy]phenyl}-5-methoxy-2H-benzotriazole, 2-{2'-Hydroxy-3'-tert-butyl-5'-[3'-methacryloyloxypropoxy]-phenyl}-5-chloro-2H-benzotriazole, 2-[2'-Hydroxy-3'-tert-butyl-5'-(3'-acryloyloxypropoxy)-phenyl]-5-trifluoromethyl-2H-benzotriazole, and combinations thereof;

wherein the sum of the amounts of repeating units (a) to (c) present in the silicone hydrogel bulk material is at least 70% by weight.

2. The contact lens precursor of claim 1, wherein said at least one silicone-containing polymerizable component comprises at least one silicone containing vinylic monomer which is selected from the group consisting of a vinylic monomer having a bis(trialkylsilyloxy)alkylsilyl group, a vinylic monomer having a tris(trialkylsilyloxy)silyl group, a polysiloxane vinylic monomer, a polycarbosiloxane vinylic monomer, 3-methacryloxy propylpentamethyldisiloxane, t-butyldimethyl-siloxyethyl vinyl carbonate, trimethylsilylethyl vinyl carbonate, trimethylsilylmethyl vinyl carbonate, and combinations thereof.

3. The contact lens precursor of claim 2, wherein said at least one silicone-containing polymerizable component further comprises at least one silicone-containing vinylic crosslinker which is selected from the group consisting of a polysiloxane vinylic crosslinker, a polycarbosiloxane vinylic crosslinker, or a combination thereof.

4. The contact lens precursor of claim 3, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol) ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinyl pyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) acrylic monomers having a $C_1$-$C_4$ alkoxyethoxy group selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra (ethylene glycol) methyl allyl ether, poly(ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth) acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth) acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy) hexyl-2'-(trimethylammonio)ethyl phosphate, 2-(vinyloxy) ethyl-2'-(trimethylammonio)ethylphosphate, 2-(allyloxy)

ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12) N-2-hydroxyethyl vinyl carbamate; (13) N-carboxyvinyl-β-alanine (VINAL); (14) N-carboxyvinyl-α-alanine; (15) or combinations thereof.

5. The contact lens precursor of claim 4, wherein said at least one N-Boc-containing vinylic monomer comprises N-[2-(N-tert-butoxycarbonylamino)ethyl] (meth)acrylamide, N-[3-(N-tert-butoxycarbonylamino)propyl] (meth)acrylamide, 2-(N-tert-butoxycarbonylamino)ethyl (meth)acrylate, 3-(N-tert-butoxycarbonylamino)propyl (meth)acrylate, 3-(N-tert-butoxycarbonylamino)-2-hydroxypropyl (meth)acrylate, Boc-protected vinylamine, Boc-protected allylamine, or combinations thereof.

6. The contact lens precursor of claim 5, wherein said at least one non-silicone vinylic cross-linking agents comprises ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, or combinations thereof.

7. The contact lens precursor of claim 6, wherein said at least one blending vinylic monomer comprises methyl methacrylate.

8. A method for producing silicone hydrogel contact lenses, comprising the steps of:
(1) preparing a polymerizable composition which is clear at room temperature, wherein the polymerizable composition comprises
  (a) from about 20% to about 79% by weight of at least one silicone-containing polymerizable component, wherein said at least one silicone-containing polymerizable component comprises at least one silicone-containing vinylic monomer, at least one silicone-containing vinylic crosslinker, or a combination thereof,
  (b) from 20% to about 79% by weight of at least one hydrophilic vinylic monomer,
  (c) from about 1% to about 15% by weight of at least one N-Boc-containing vinylic monomer,
  (d) from 0 to about 2.5% by weight of a non-silicone vinylic crosslinker,
  (e) from about 0.05% to about 2.0% by weight of a free-radical initiator,
  (f) from 0 to about 25% by weight of at least one blending vinylic monomer, and
  (g) from 0 to about 3.0% by weight of at least one UV-absorbing vinylic monomer and/or at least one UV/HEVL-absorbing vinylic monomer,
  relative to the total amount of all polymerizable components in the polymerizable composition, provided that the sum of the amounts of components (a) to (g) and other not-listed polymerizable components is 100%;
(2) introducing the polymerizable composition into a lens mold;
(3) curing thermally or actinically the polymerizable composition in the lens mold to form a silicone hydrogel contact lens precursor comprising N-Boc-containing repeating units of the N-Boc-containing vinylic monomer, wherein each N-Boc-containing repeating unit comprises a Boc-protected amino group of —NH-Boc;
(4) converting the N-Boc-containing repeating units into primary-amino-containing repeating units each having a primary amino group (—NH$_2$) by immersing the silicone hydrogel contact lens precursor in a liquid medium having a pH of about 4 or less for a time period sufficient to obtain a silicone hydrogel contact lens having primary amino groups thereon; and
(5) covalently attaching a hydrophilic polymeric material onto the silicone hydrogel contact lens having primary amino groups thereon to form a silicone hydrogel contact lens with a coating of the hydrophilic polymeric material thereon, wherein the hydrophilic polymeric material comprises one or more reactive functional groups each coreactive with one primary amino group on the surface of the silicone hydrogel contact lens to form a covalent linkage in the absence or presence of a coupling agent.

9. The method of claim 8, wherein the lens mold is made of a hydrophobic polymeric material.

10. The method of claim 8, wherein the lens mold is made of polypropylene.

11. The method of claim 8, wherein liquid medium having a pH of from 1.0 to about 4.0.

12. The method of claim 8, wherein the liquid medium is acidified water, an aqueous solution, an acidified mixture of water with one or more organic solvents miscible with water, an acidified organic solvent selected from the group consisting of 1,2-propylene glycol, a polyethyleneglycol having a number average molecular weight of about 400 Daltons or less, a $C_1$-$C_6$ alkylalcohol, or combination thereof, or an acidified mixture of organic solvents, or combination thereof.

13. The method of claim 8, wherein the liquid medium is acidified with formic acid, hydrochloric acid, sulfuric acid, or a combination thereof.

14. The method of claim 8, wherein the step of converting N-Boc-containing repeating units to primary-amino-containing repeating units is carried out at a temperature of from about 40° C. to about 80° C.

15. The method of claim 8, wherein the hydrophilic polymeric material comprises one or more reactive functional groups which are azetidinium groups, aziridine group, N-hydroxysuccinimide ester, carboxyl groups, acid halide group, acid anhydrate group, aldehyde group, azlactone group, isocyanate group, or combinations thereof.

16. The method of claim 15, wherein the step of covalently attaching the hydrophilic polymeric material to the silicone hydrogel contact lens is performed by autoclaving the silicone hydrogel contact lens having primary amino groups thereon which is immersed in a packaging solution in a sealed lens package at a temperature of from about 115° C. to about 125° C. for 20 to 90 minutes, wherein the packaging solution comprises at least 0.01% by weight of the hydrophilic polymeric material.

17. A silicone hydrogel contact lens obtained according to the method of claim 8.

18. The silicone hydrogel contact lens of claim 17, wherein the silicone hydrogel contact lens has an oxygen permeability of at least 50 barrers, an elastic modulus of from about 0.2 MPa to about 1.5 MPa, and an equilibrium water content of from about 40% to about 70%.

19. The silicone hydrogel contact lens of claim 18, wherein the silicone hydrogel contact lens has a water-break-up-time of at least 10 seconds, a water contact angle by static sessile drop of about 90 degrees or less, a friction rating of about 2 or less, or a combination thereof.

\* \* \* \* \*